United States Patent
Grovijohn et al.

(10) Patent No.: US 10,351,357 B1
(45) Date of Patent: Jul. 16, 2019

(54) END EFFECTOR ASSEMBLY AND METHODS OF USE THEREOF

(71) Applicant: CONTAINER AUTOMATION SYSTEMS, INC., Cumming, GA (US)

(72) Inventors: Ryan G. Grovijohn, Cumming, GA (US); Mark T. Jackson, Buford, GA (US); Richard E. Chitwood, Cumming, GA (US)

(73) Assignee: CONTAINER AUTOMATION SYSTEMS, INC., Cumming, GA (US)

( * ) Notice: Subject to any disclaimer, the term of this patent is extended or adjusted under 35 U.S.C. 154(b) by 0 days.

(21) Appl. No.: 15/926,172

(22) Filed: Mar. 20, 2018

(51) Int. Cl.
| | |
|---|---|
| *B65G 47/91* | (2006.01) |
| *B25J 15/00* | (2006.01) |
| *B65B 35/38* | (2006.01) |
| *B65B 5/08* | (2006.01) |
| *B25J 15/06* | (2006.01) |

(52) U.S. Cl.
CPC ........ *B65G 47/918* (2013.01); *B25J 15/0019* (2013.01); *B25J 15/0061* (2013.01); *B25J 15/0616* (2013.01); *B65B 5/08* (2013.01); *B65B 35/38* (2013.01)

(58) Field of Classification Search
CPC ............... H01L 21/6838; B25J 15/0226; B25J 15/0616; B25J 15/0061; B25J 15/0019; B65G 47/91; B65G 47/918; B65G 47/917; B65B 35/38; B65B 5/08
See application file for complete search history.

(56) References Cited

U.S. PATENT DOCUMENTS

| | | | | | |
|---|---|---|---|---|---|
| 4,858,906 | A | * | 8/1989 | Fyler ........................ | B65H 3/22 271/19 |
| 6,217,093 | B1 | * | 4/2001 | Neutel ................... | B65G 47/28 198/468.3 |
| 6,346,682 | B2 | * | 2/2002 | Kim ...................... | B65G 47/911 209/573 |
| 6,439,631 | B1 | * | 8/2002 | Kress .................... | B65G 47/918 294/65 |
| 8,038,191 | B2 | * | 10/2011 | Shim ................... | H05K 13/0482 294/65 |
| 9,073,222 | B2 | * | 7/2015 | Crosby ................. | B65G 47/918 |
| 2002/0153735 | A1 | * | 10/2002 | Kress ................... | B65G 47/918 294/87.1 |

* cited by examiner

*Primary Examiner* — Stephen A Vu
(74) *Attorney, Agent, or Firm* — Gardner Groff Greenwald & Villanueva, PC

(57) ABSTRACT

An end effector assembly including an elongate arm plate and one or more manifold cradle assemblies movable along the elongate arm plate. The one or more manifold cradle assemblies are repositionable between a first spaced-apart configuration and a second spaced-apart configuration, and at least one engagement member is provided with each manifold cradle assembly that can be oriented in either a picking orientation or a placing orientation.

15 Claims, 30 Drawing Sheets

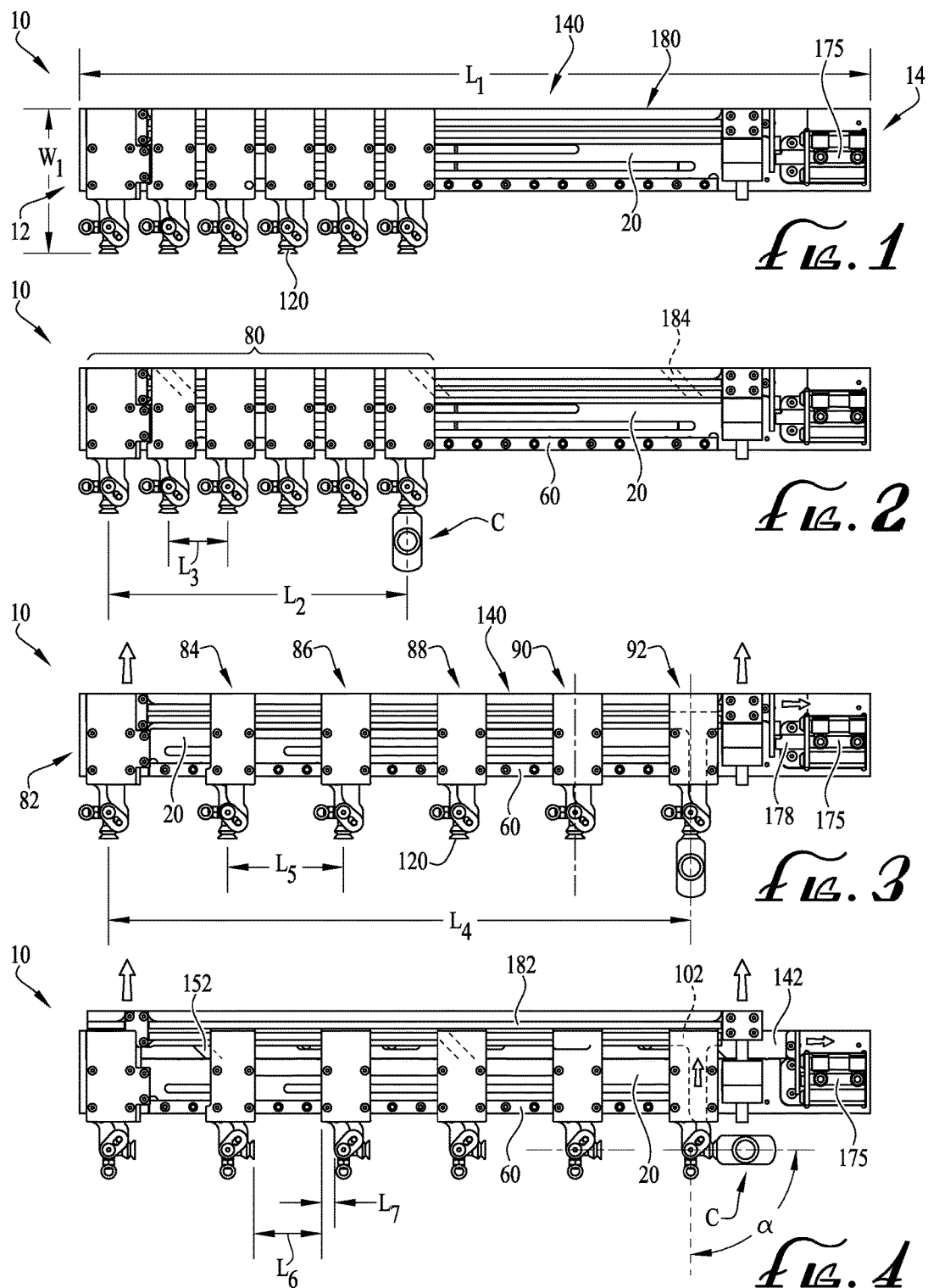

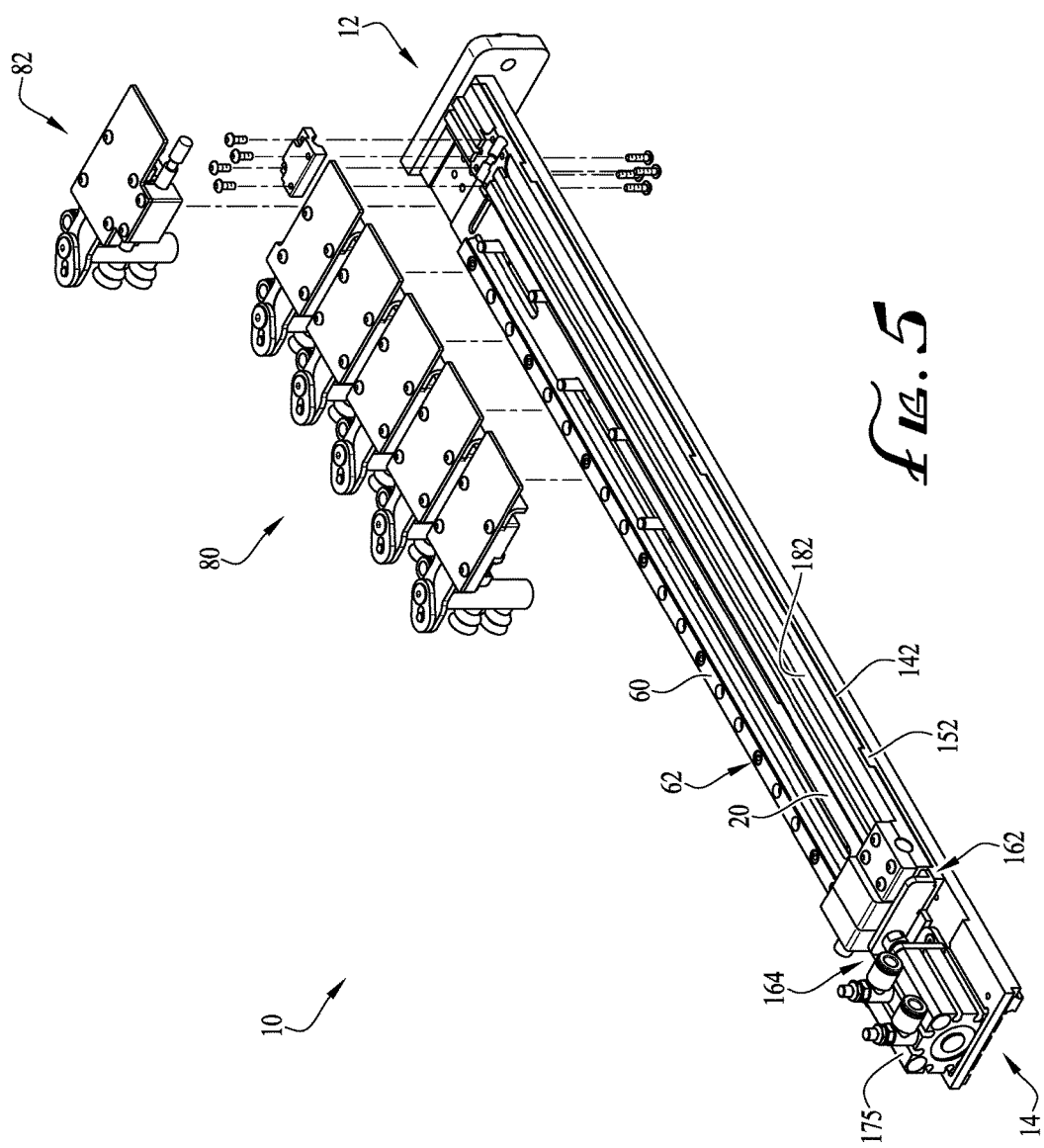

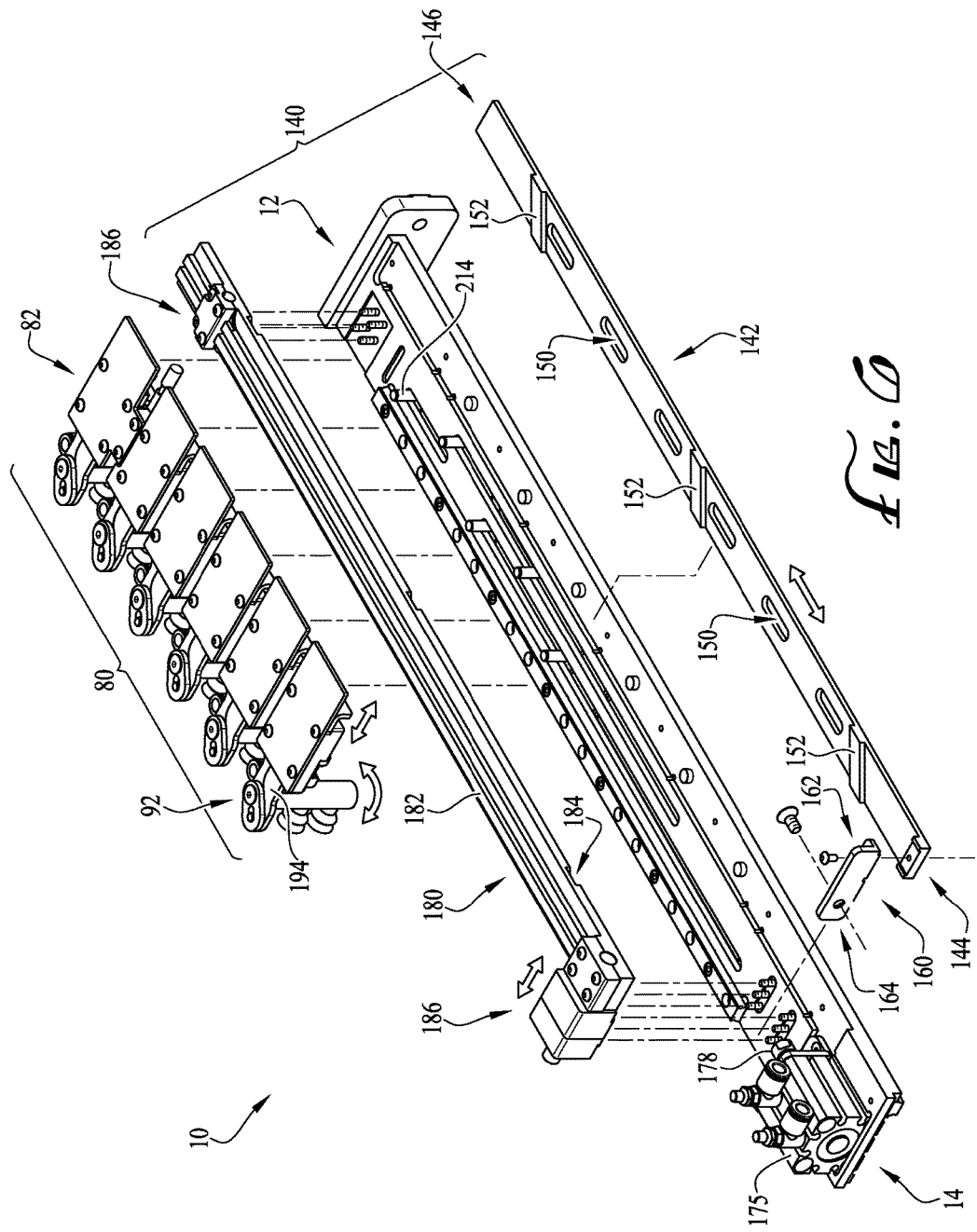

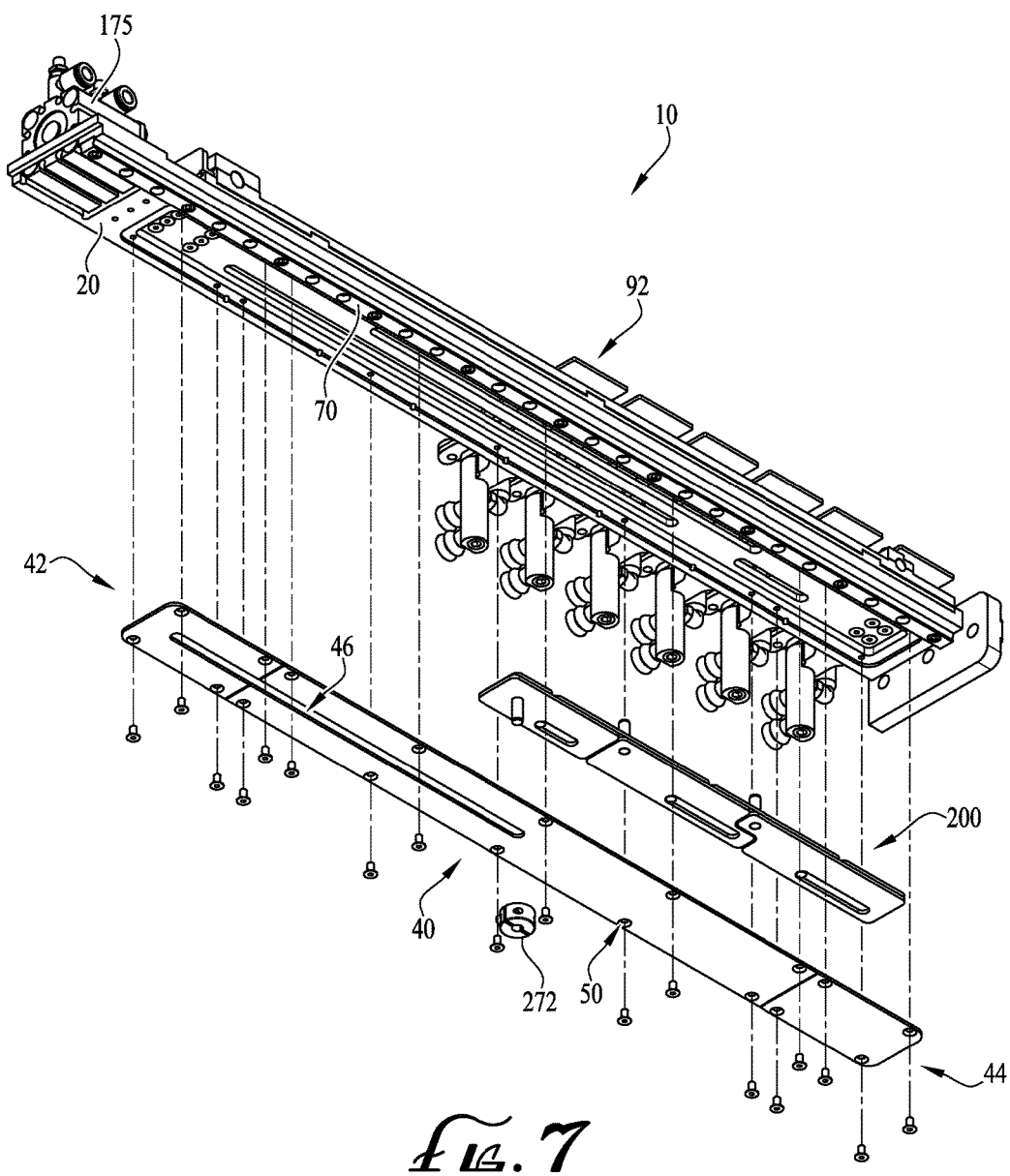

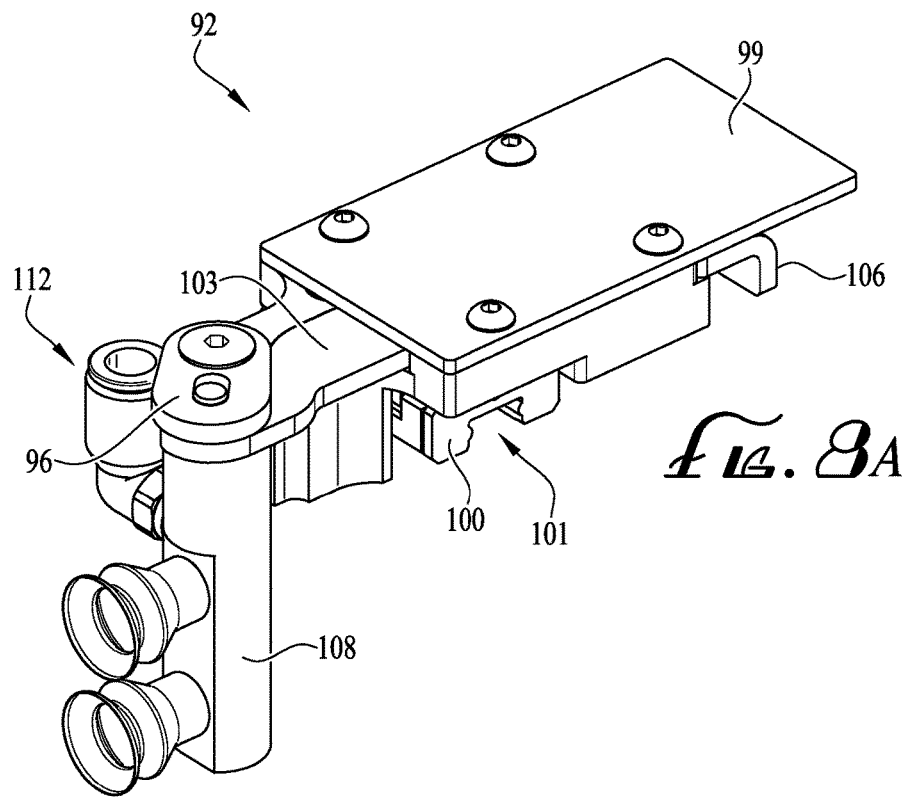
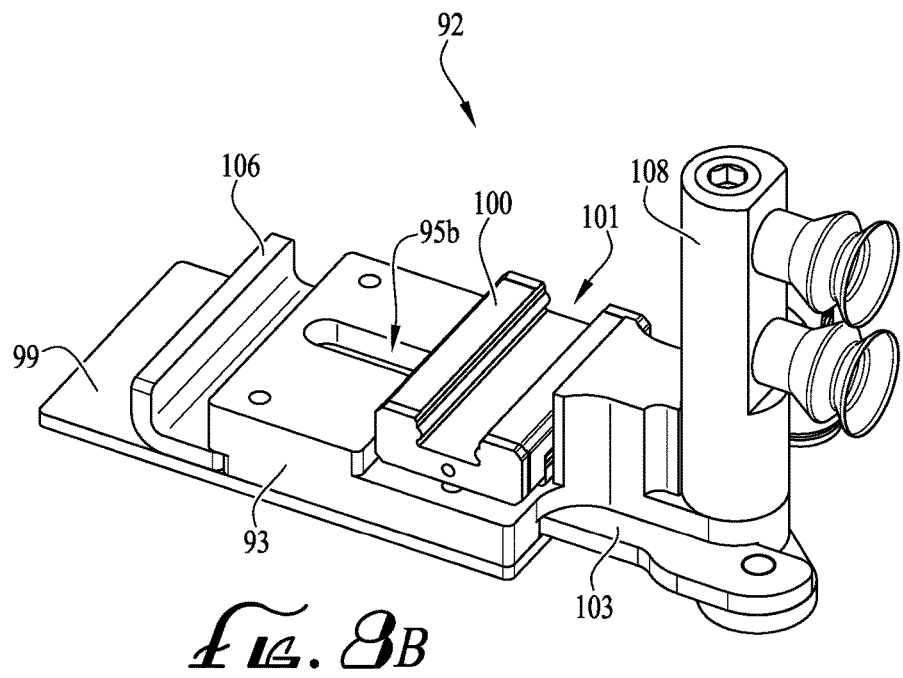

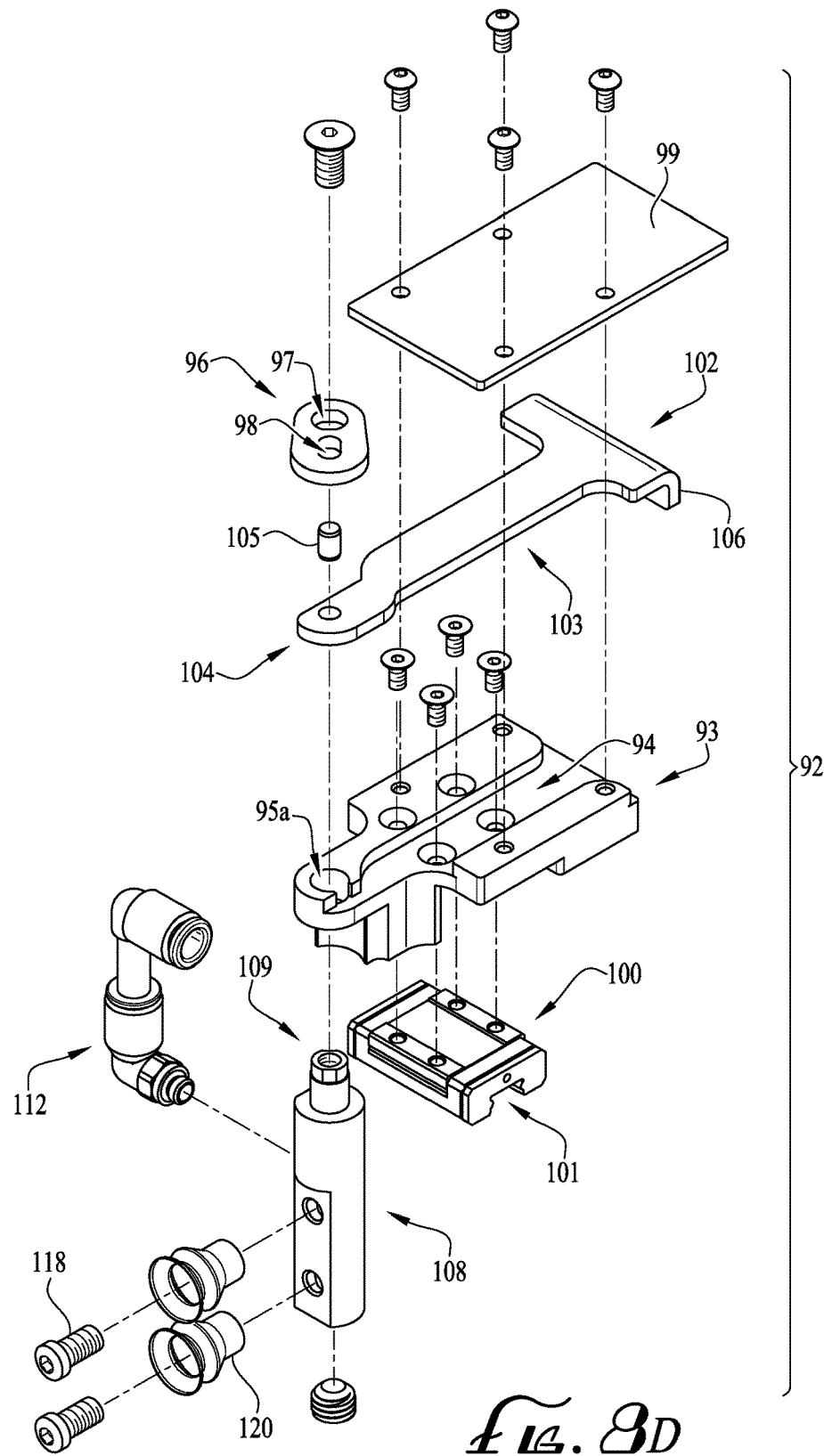

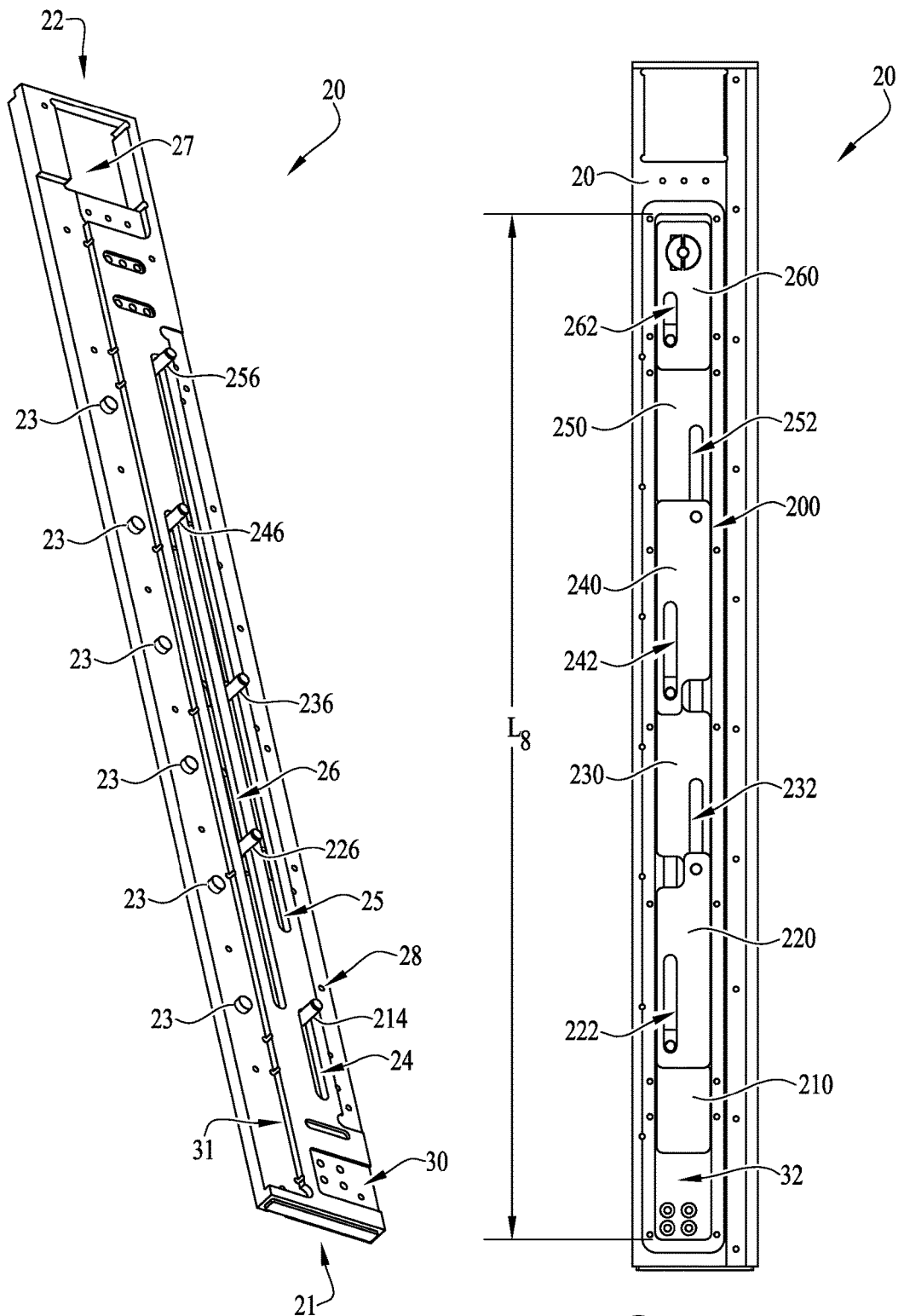

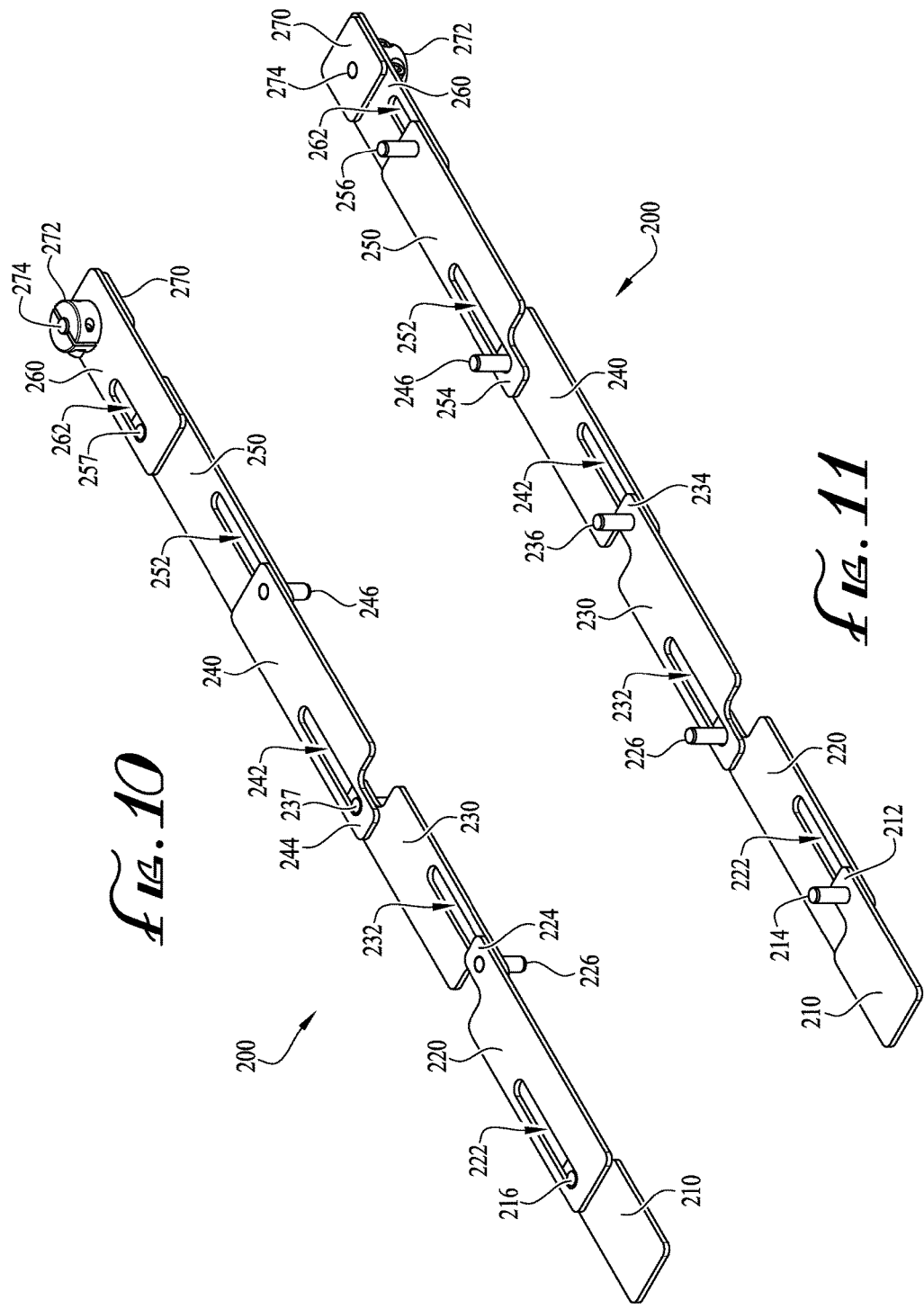

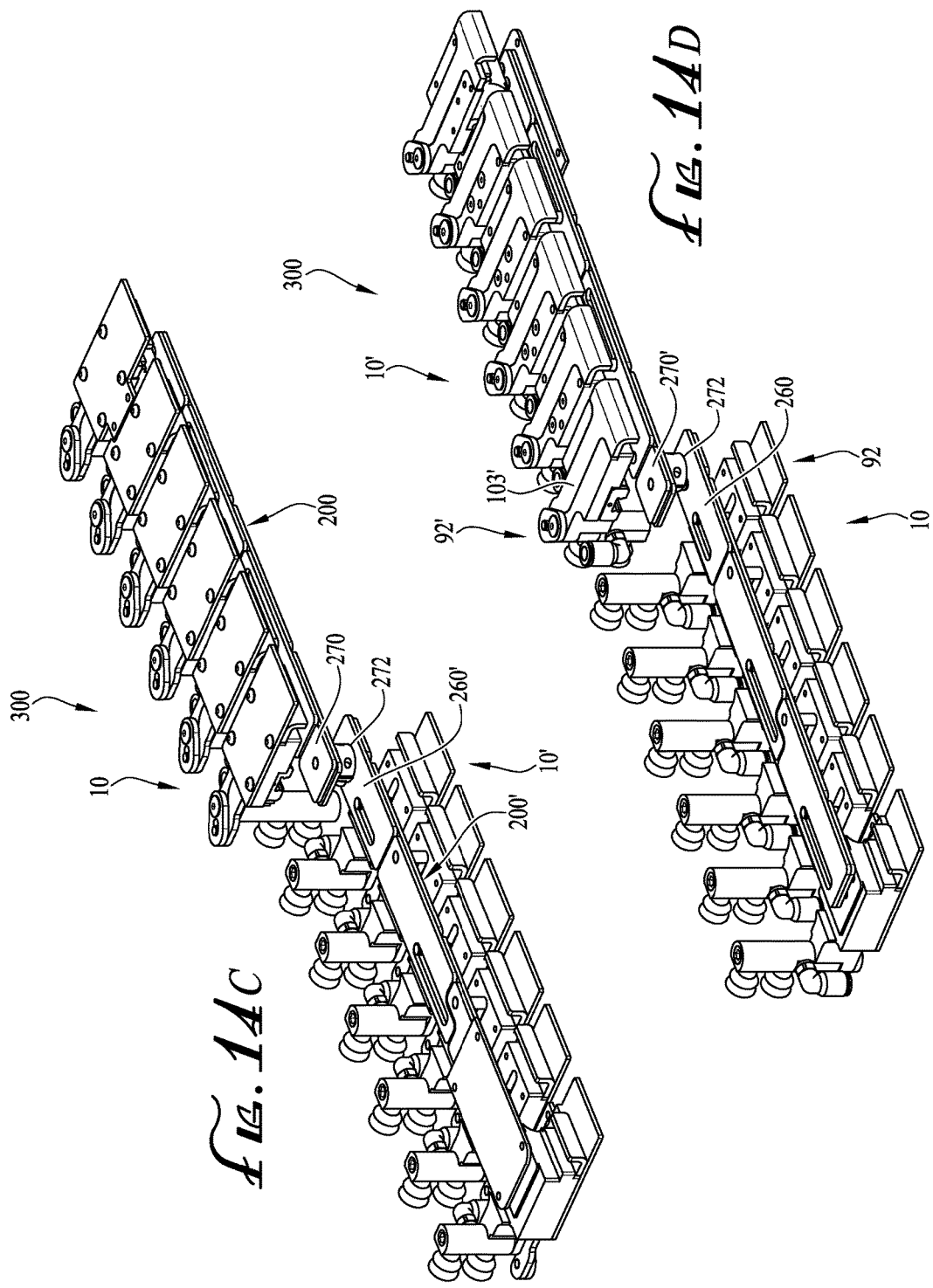

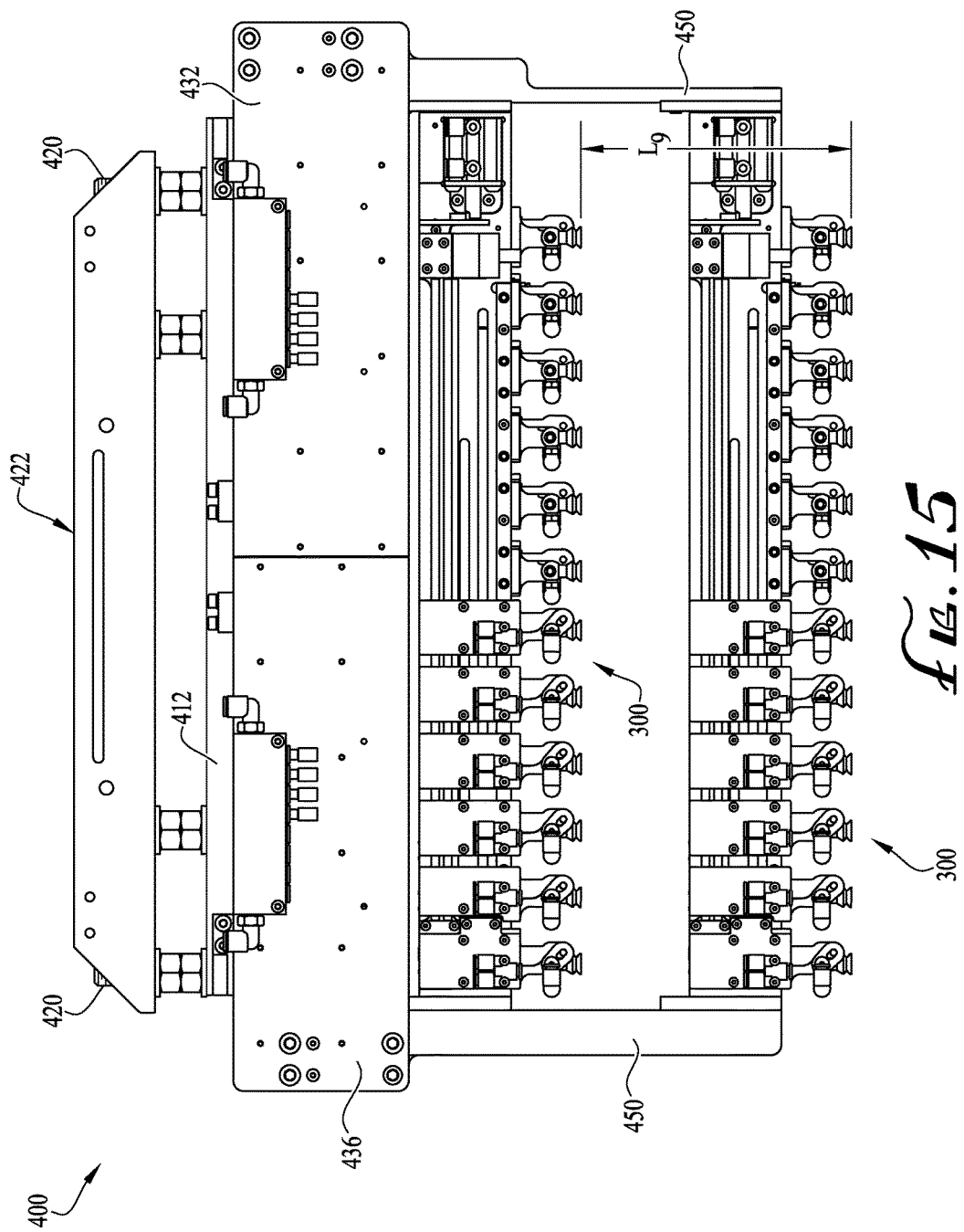

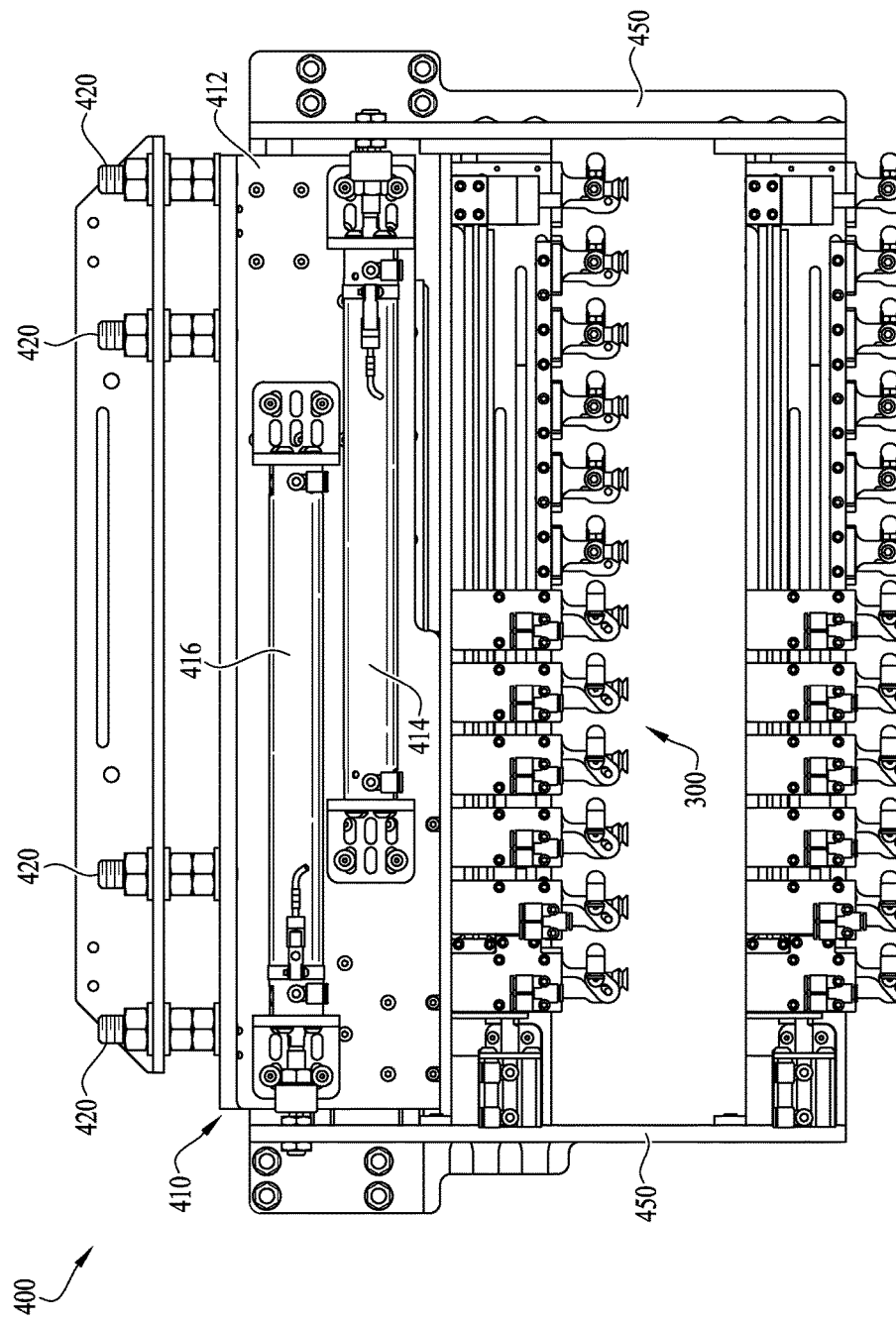

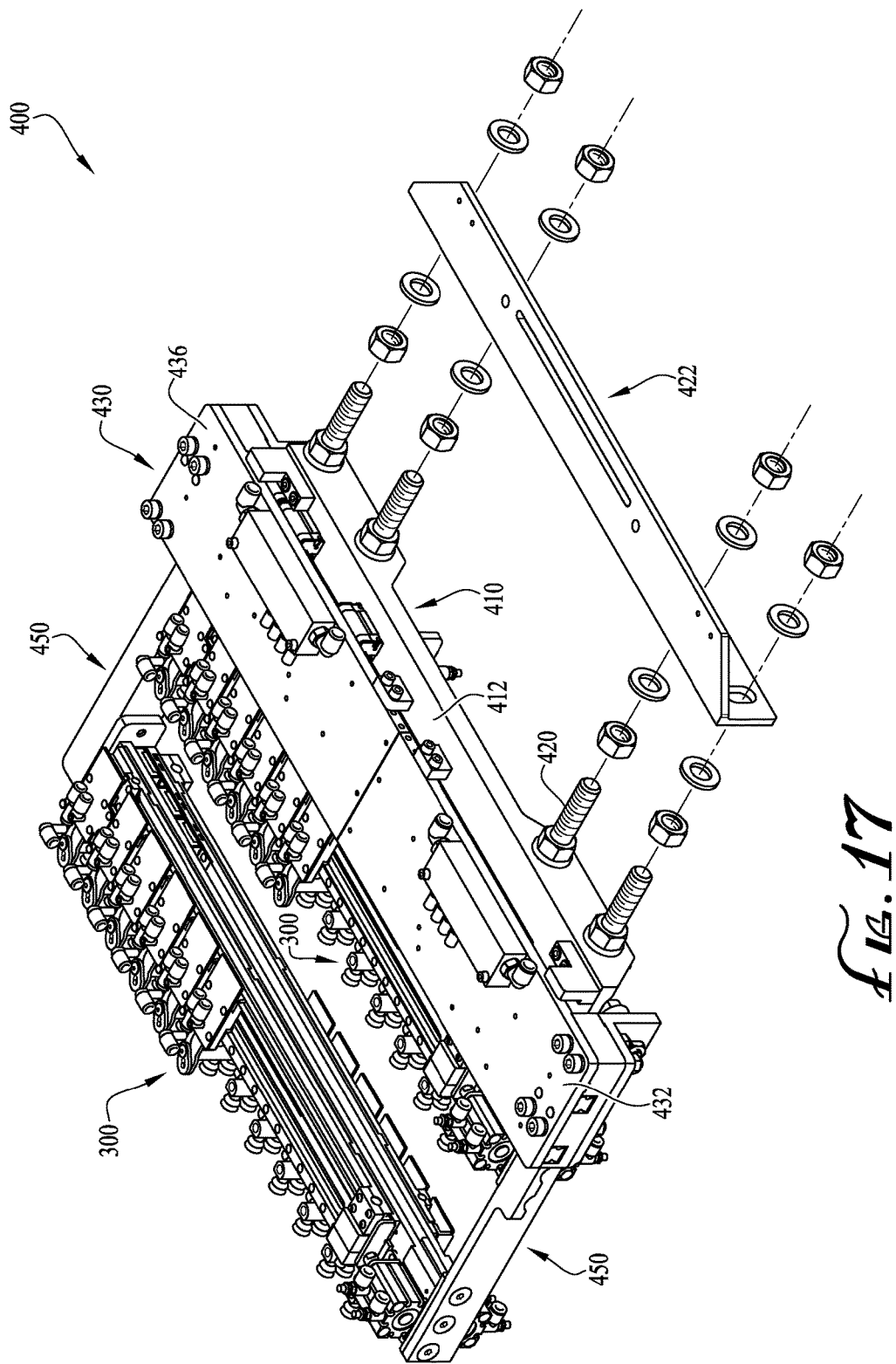

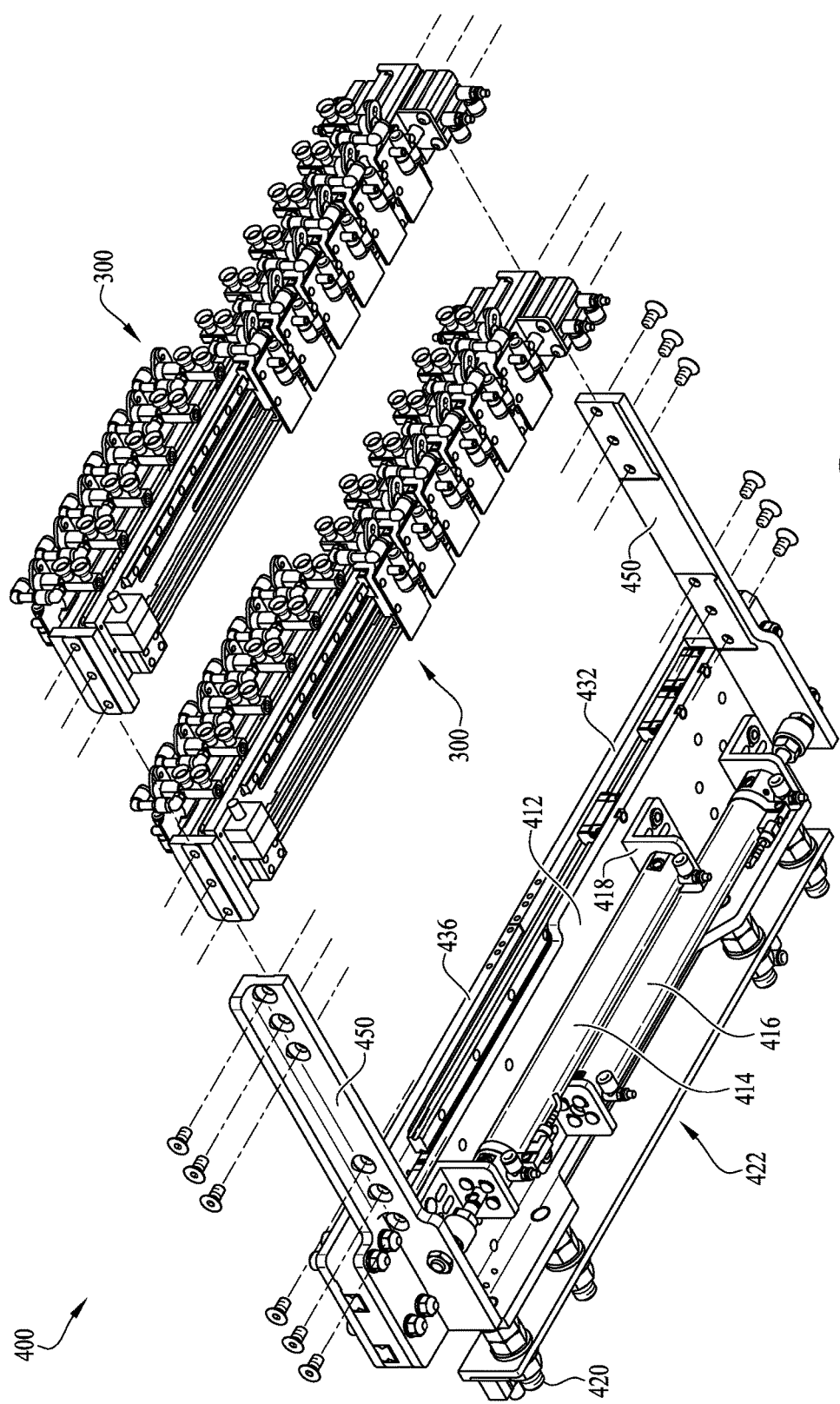

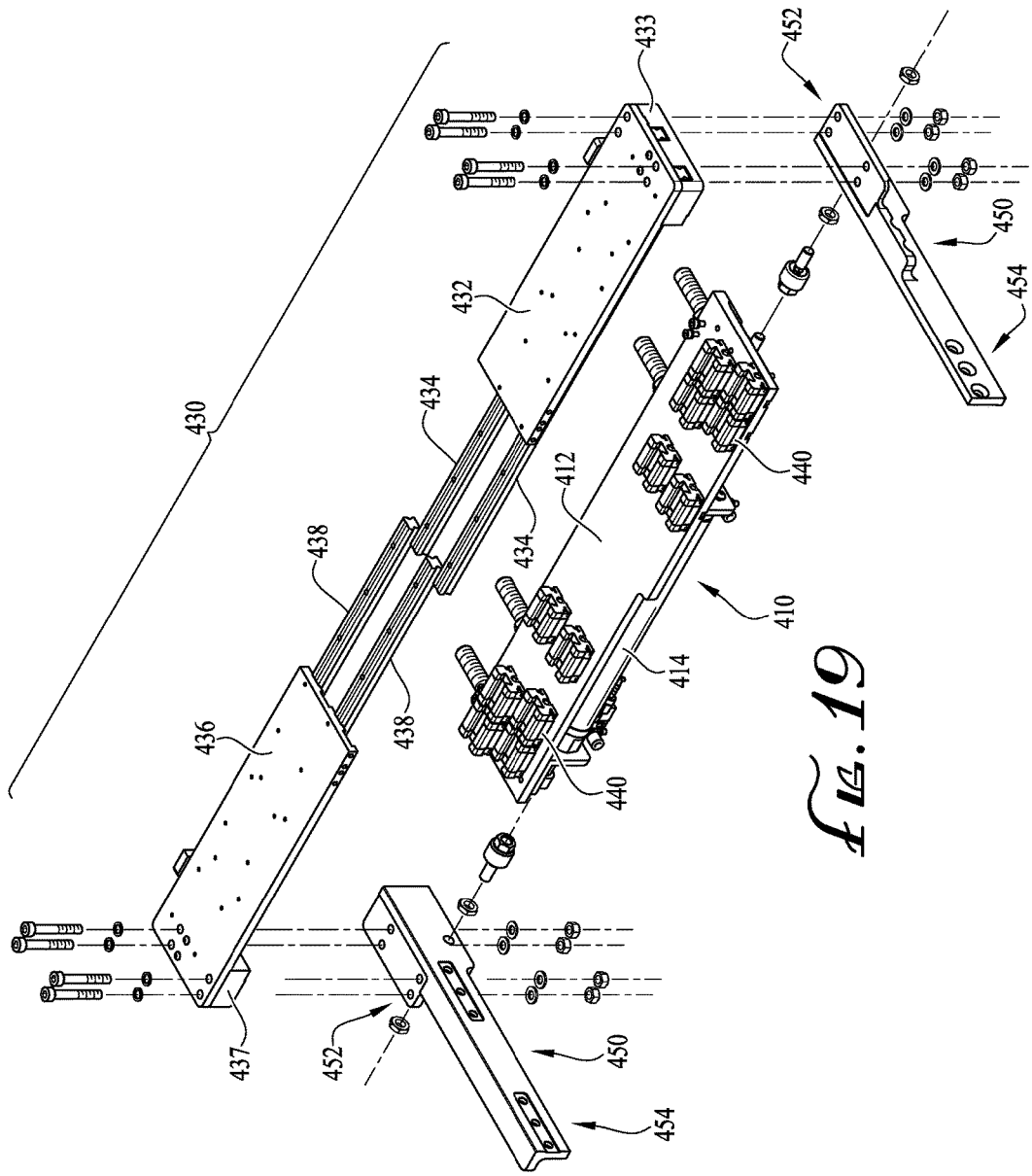

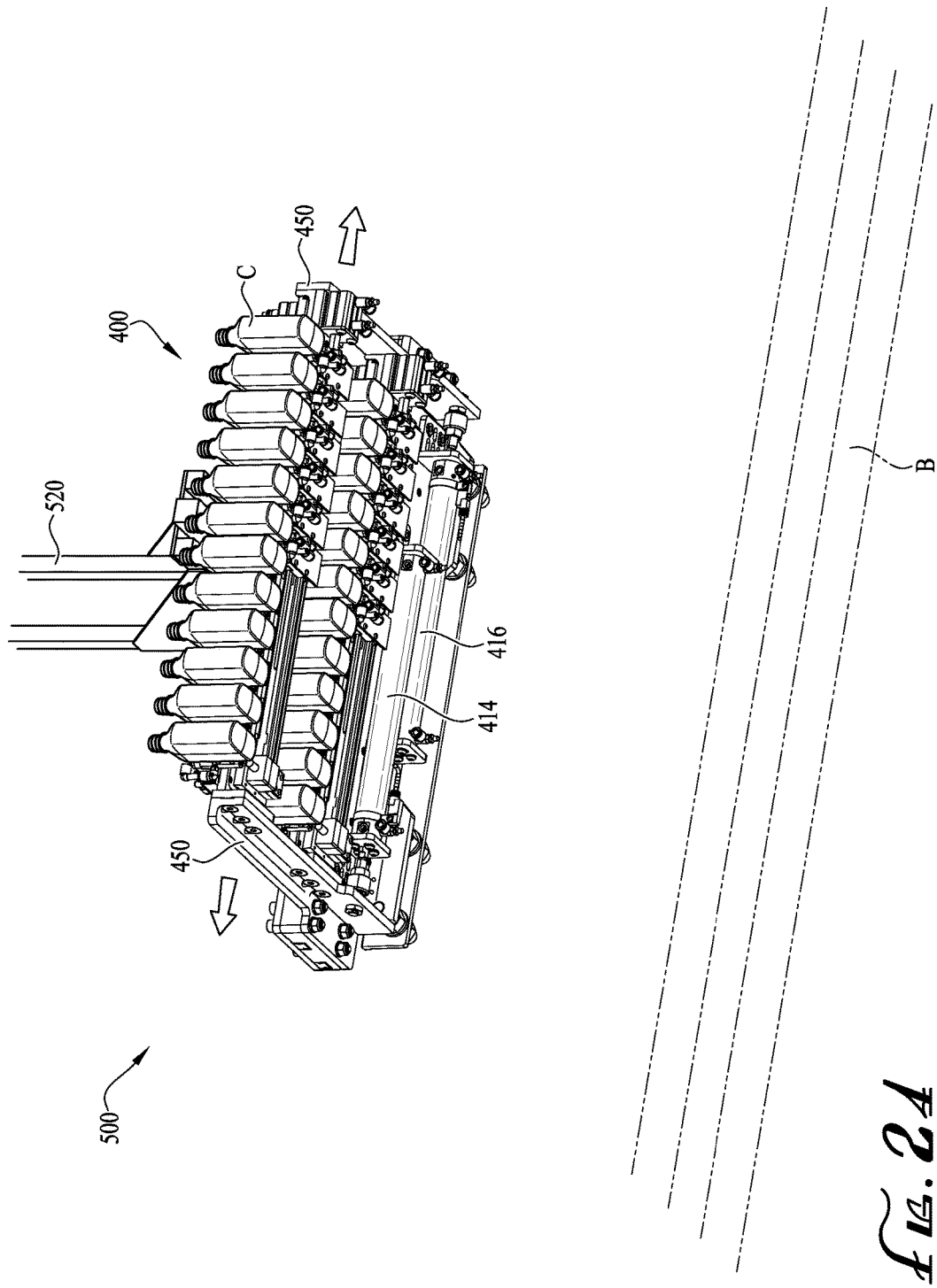

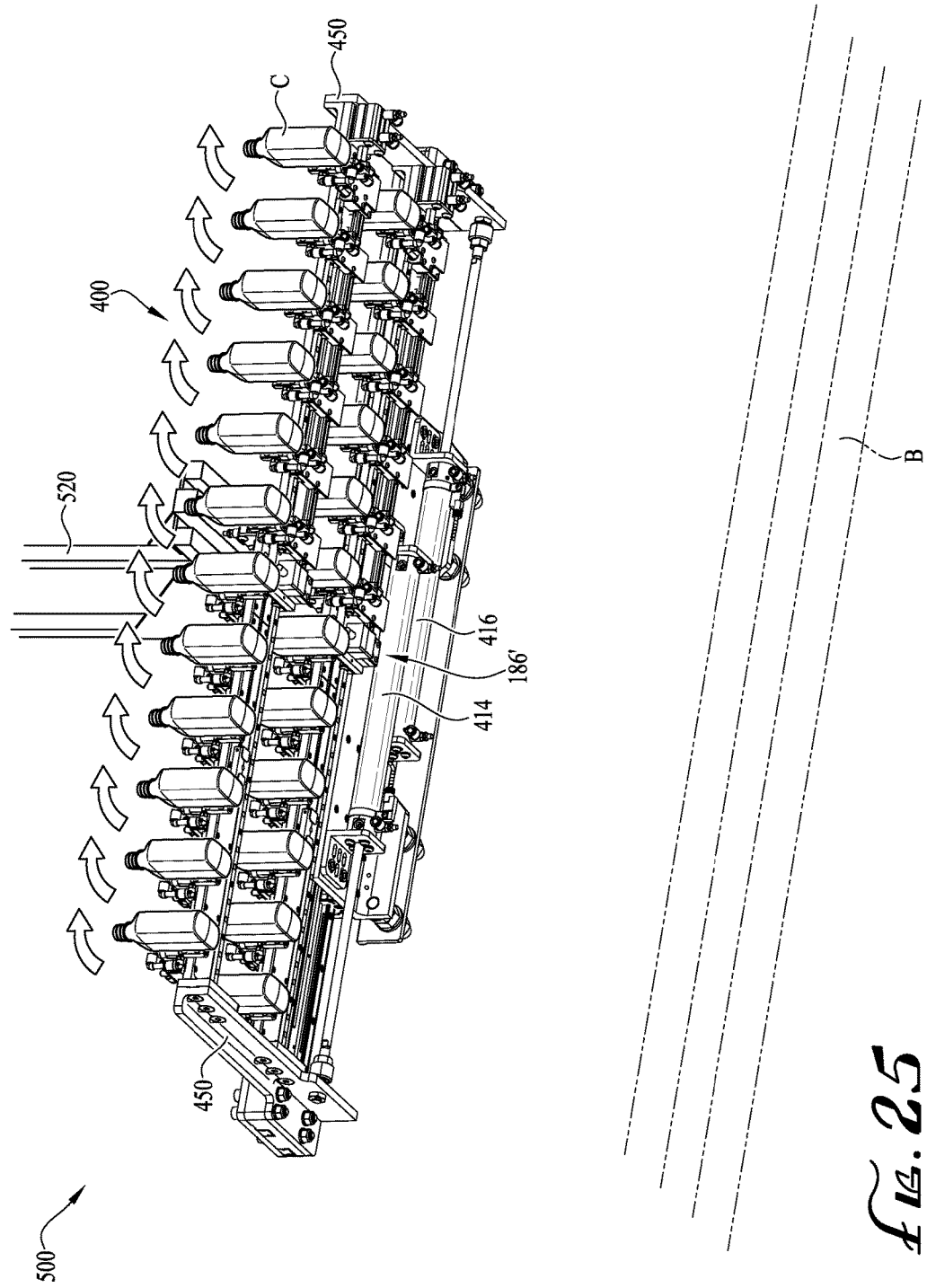

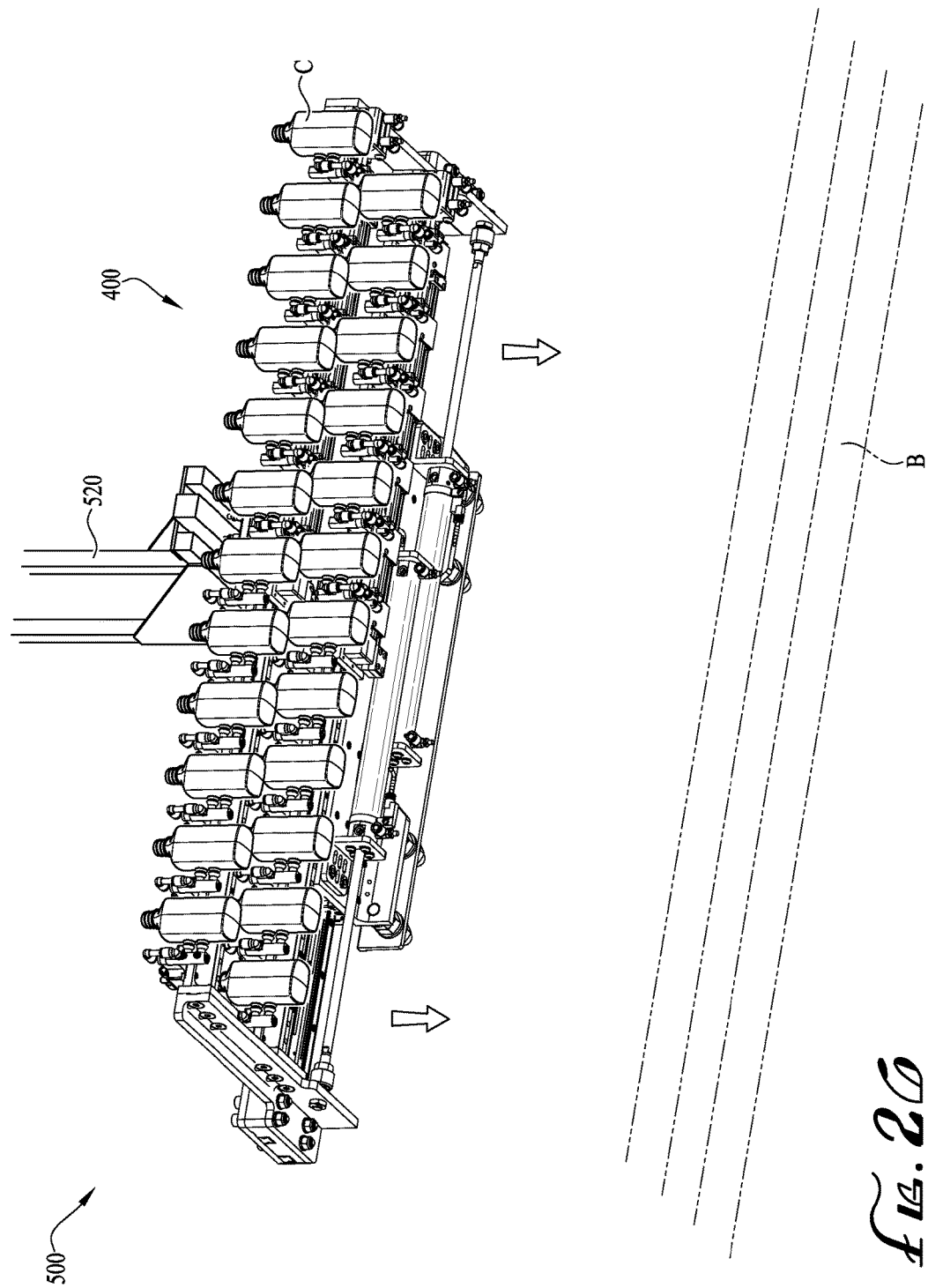

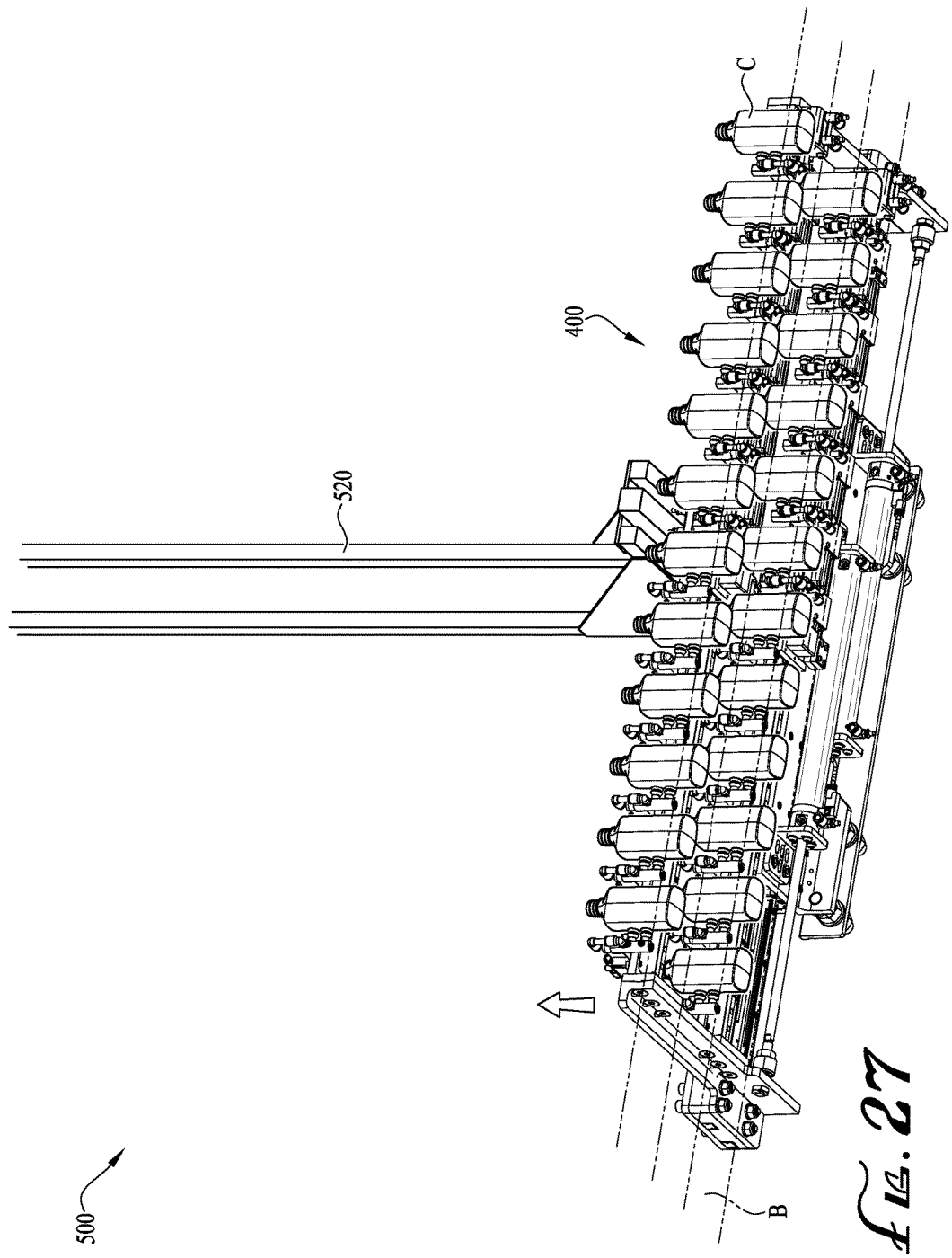

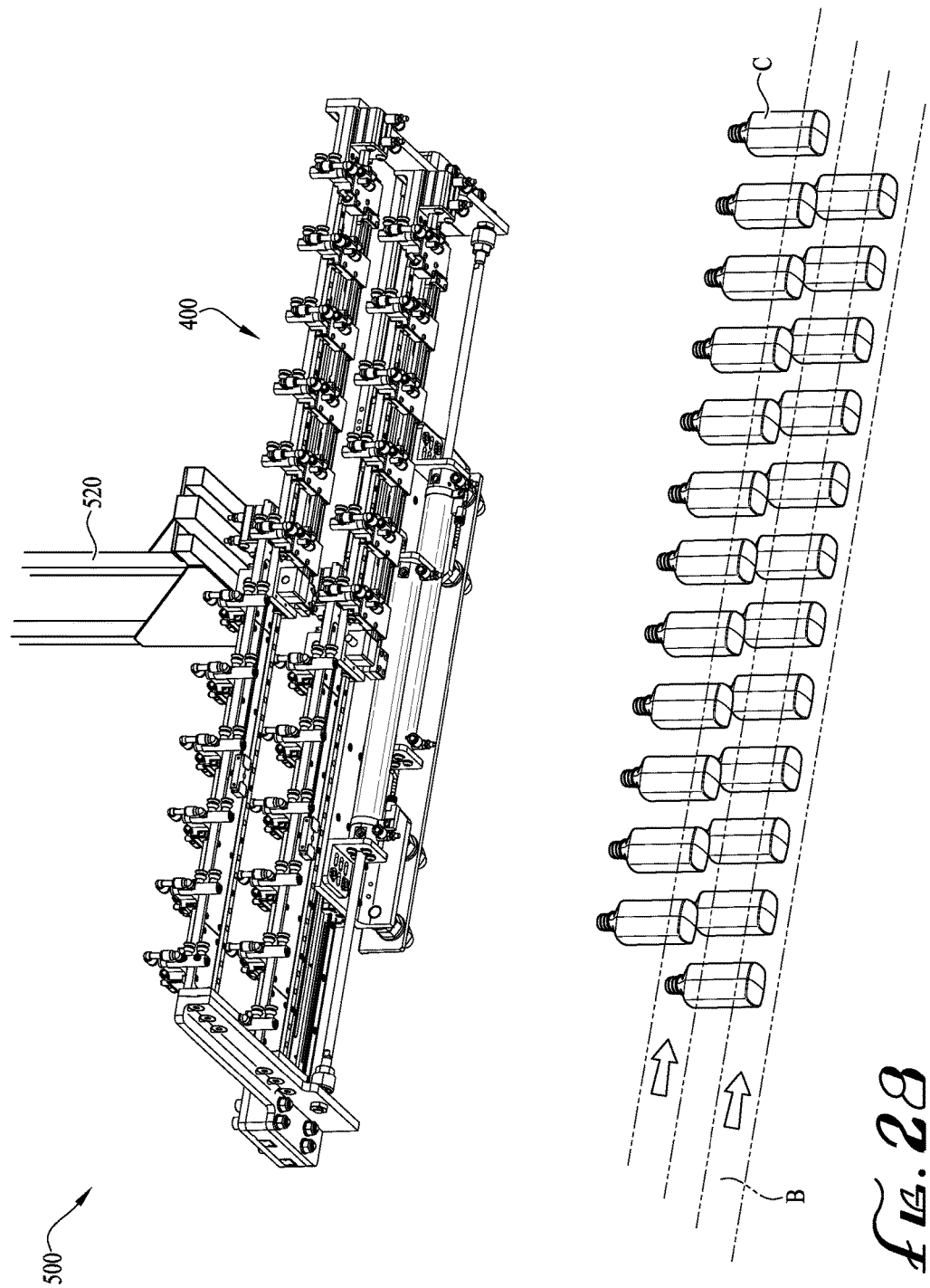

END EFFECTOR ASSEMBLY AND METHODS OF USE THEREOF

TECHNICAL FIELD

The present invention relates generally to the field of machines and assemblies for picking and placing objects, and more particularly to end effector assemblies for picking objects in a first orientation and placing the objects in a second orientation.

BACKGROUND

Containers, bottles and other disposable packages are often manufactured by a molding process such as injection or blow molding. In some cases, end of arm tooling can be provided for guiding or picking the molded components from the mold, for example, to be placed along a portion of an assembly line or placed at a location for conducting one or more post-processing measures. In cases where the molded components are made in large volume, a multi-cavity mold is likely to be used to obtain a larger quantity of components per molding cycle. However, a drawback to multi-cavity molds is that known end of arm tooling or other mechanisms or engagement members for picking and placing components from the mold to a desired location are not intended and customizable to pick a plurality of components at once. Another drawback to known end of arm tooling is lack of being able to reconfigure or adjust the orientation of the one or more components prior to them being placed. that the configuration in which the components were picked is likely to be the configuration Accordingly, it can be seen that needs exist for improvements to end of arm tooling or end effectors and methods of use thereof. It is to the provision of an end effector assembly meeting these and other needs that the present invention is primarily directed.

SUMMARY

In example embodiments, the present invention provides an end effector assembly for picking objects or bottles from or generally near a mold and placing them in a desired location.

In one aspect, the present invention relates to an end effector assembly including an elongate arm plate, one or more manifold cradle assemblies, a linkage assembly, and a push-to-pull motion conversion assembly. In example embodiments, the elongate arm plate extends from a first end to a second end and has a length defined therebetween. The one or more manifold cradle assemblies are movable along the length of the elongate arm plate. In example embodiments, each of the one or more manifold cradle assemblies include at least one engagement member that is pivotable between a picking orientation and a placing orientation. In example embodiments, the linkage assembly movably couples the elongate arm plate to the one or more manifold cradle assemblies. In example embodiments, the linkage is configured such that the one or more manifold cradle assemblies can be reconfigurable between a first spaced-apart configuration and a second spaced-apart configuration extending along the length of the elongate arm plate.

In example embodiments, the push-to-pull motion conversion assembly includes a first drive member movable along at least a portion of the length of the elongate arm plate and a second drive member linked with the first drive member. In example embodiments, movement of the first drive member along at least a portion of the length of the elongate arm plate causes movement of the second drive member in a direction generally transverse to the movement of the first drive member. In example embodiments, movement of the second drive member in the transverse direction causes the at least one engagement member of the one or more cradle assemblies to pivot from the picking orientation to the placing orientation.

In example embodiments, the first spaced-apart configuration is such that the manifold cradle assemblies are generally spaced close together wherein a first spacing is defined therebetween, and wherein the second spaced-apart configuration is such that the manifold cradle assemblies are generally spaced further apart from each other wherein a second spacing is defined therebetween.

In example embodiments, an angle of between about 40-95 degrees is defined between the picking and placing orientations of the at least one engagement member.

In example embodiments, the at least one engagement member is configured for picking at least one container from a mold in the picking orientation, and wherein the at least one engagement member is configured for placing the at least one container in the placing orientation. In example embodiments, the at least one engagement member is configured for placement of the at least one container on a conveyor belt. In example embodiments, the at least one engagement member can pivot between the picking and placing orientations independently of the position of the one or more cradle assemblies.

In example embodiments, the two or more cradle assemblies are mounted together and reconfigurable between the first spaced-apart configuration defining a first spacing between each assembly and the second spaced-apart configuration defining a second spacing between each assembly. According to one example embodiment, ten cradle assemblies are mounted to be movable and reconfigurable between the first spaced-apart configuration defining a first spacing between each assembly and the second spaced-apart configuration defining a second spacing between each assembly. In example embodiments, an elongate arm having six cradle assemblies movably mounted thereto movably mounts with another elongate arm having six cradle assemblies movably mounted thereto. In example embodiments, the elongate arms are generally stacked atop each other when the twelve cradle assemblies are positioned in the first spaced-apart configuration and wherein the elongate arms are generally offset relative to each other in generally opposite directions when the twelve cradle assemblies are positioned in the second spaced-apart configuration.

In example embodiments, a plurality of coupled together and spaced-apart cradle assemblies define a first assembly of twelve cradle assemblies that are spaced-apart from a second assembly of twelve cradle assemblies. In example embodiments, each of the first and second assemblies are reconfigurable between the first spaced-apart configuration defining a first spacing between each assembly and a second spaced-apart configuration defining a second spacing between each assembly. In example embodiments, the at least one container includes an unconventional parting line.

In another aspect, the invention relates to a method of picking and placing one or more parts including providing an end effector, the end effector comprising one or more engagement members for coupling engagement with one or more parts, the one or more engagement members being moveable between a first spaced-apart configuration and a second spaced-apart configuration and being reconfigurable between a picking orientation and a placing orientation;

positioning the one or more engagement members of the end effector in the first spaced-apart configuration and the picking orientation; moving the end effector to a first location near the one or more parts to pick up the one or more parts; moving the end effector with the one or more parts attached thereto to a second location; moving the one or more engagement members from the first spaced-apart configuration to a second spaced-apart configuration and from the picking orientation to the placing orientation; and placing and releasing the one or more parts while the one or more engagement members are in the placing orientation.

In example embodiments, the one or more parts are placed on a conveyor belt. In example embodiments, the part is a bottle. In example embodiments, the bottle has an unconventional parting line. In example embodiments, the engagement members include at least one suction cup, and wherein the at least one suction cup provides a vacuum against a narrow side portion of the bottle. In example embodiments, the one or more bottles are placed on at least one conveyor belt movable along a first direction, and wherein orienting the one or more bottles in the placing orientation causes wide side portions of the one or more bottles to extend in a direction that is generally aligned with the first direction of the conveyor belt.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a top plan view of an end effector assembly according to an example embodiment of the present invention, showing a plurality of spaced-apart manifold assemblies in a collapsed configuration wherein each of the manifold assemblies includes an engagement member positioned in a picking orientation.

FIG. 2 is a top plan view of an end effector assembly of FIG. 1, showing at least one of the engagement members of the assemblies in the picking orientation and engaged with a container.

FIG. 3 is a top plan view of the end effector assembly of FIG. 2, showing the manifold assemblies spaced-apart in an expanded configuration and at least one of the engagement members of the assemblies in the picking orientation and engaged with a container.

FIG. 4 is a top plan view of the end effector assembly of FIG. 3, showing the manifold assemblies spaced-apart in an expanded configuration and at least one of the engagement members of the assemblies in the placing orientation and engaged with a container.

FIG. 5 is a top perspective assembly view of the end effector assembly of FIG. 1.

FIG. 6 is a top perspective assembly view of the end effector assembly of FIG. 5, showing components offset therefrom to show hidden portions thereof.

FIG. 7 is a bottom perspective view of the end effector assembly of FIG. 1, showing components thereof offset therefrom to show hidden portions thereof.

FIG. 8A shows a top perspective view of one of the manifold assemblies of FIG. 1.

FIG. 8B shows a bottom perspective view of the manifold assembly of FIG. 8A.

FIG. 8D is a top perspective assembly view of the manifold assembly of FIG. 8A.

FIG. 9A show top perspective view of an arm plate assembly and linkage assembly, wherein the linkage assembly is in a second spaced-apart configuration.

FIG. 9B shows a bottom plan view of the arm plate and linkage assembly of FIG. 9A.

FIG. 10 shows a top perspective view of the linkage assembly of FIG. 9B.

FIG. 11 shows a bottom perspective view of the linkage assembly of FIG. 10.

FIG. 14C is an upper rear perspective view of the pair of movably mounted end effector assemblies of FIG. 14B, wherein some portions are removed to show hidden portions thereof.

FIG. 14D is a lower rear perspective view of the movably mounted end effector assemblies of FIG. 14C.

FIG. 15 is a top plan view of an end effector assembly according to an example embodiment of the present invention.

FIG. 16 is a bottom plan view of the end effector assembly of FIG. 15.

FIG. 17 is a rear perspective assembly view of a portion of the end effector assembly of FIG. 15.

FIG. 18 is a front perspective assembly view of a portion of the end effector assembly of FIG. 15.

FIG. 19 is a front perspective view of a portion of the end effector assembly of FIG. 15.

FIGS. 20-28 show a sequence of operation of the end effector assembly of FIG. 15, showing the assembly picking and holding a plurality of containers in the picking orientation and placing and releasing the containers on a conveyor belt in the placing orientation.

DETAILED DESCRIPTION OF EXAMPLE EMBODIMENTS

Figure 8C:
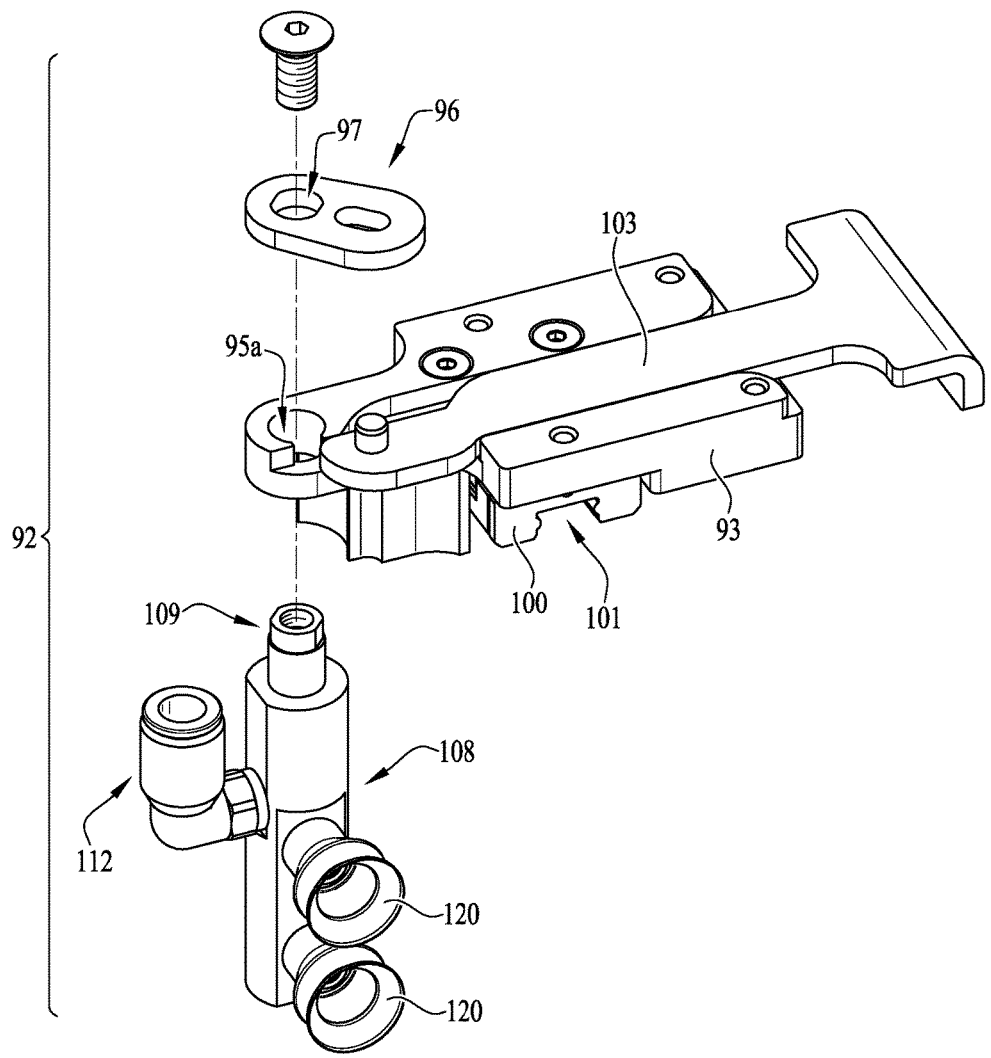
FIG. 8C is a top perspective assembly view of the manifold assembly of FIG. 8A, wherein some components of the assembly are removed to show hidden portions thereof.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Example embodiments of the present invention relate to one or more end effector assemblies and to methods of picking and placing parts or components, for example, picking parts from a mold (e.g., generally a multi-cavity injection or blow mold) and placing them in a desirable orientation and location such as atop a conveyor belt or other location along an assembly or manufacturing line to allow further post-manufacturing measures to be conducted such as quality control testing (e.g., leak testing, etc.), printing, further assembly, filling, capping, packaging, or other post-molding processes. In example embodiments, the end effector assemblies of the present invention are configured to pick and place one or more components or parts (i.e., a container or bottle C as described herein). According to some example embodiments, the one or more end effector assemblies of the present invention can preferably pick and place a plurality components at once. In some example embodiments, the one or more end effector assemblies of the present invention are capable of picking one or more bottles C from or generally near a mold at a first location, carrying the one or more bottles C to a second location, and placing the one or more bottles C at the second location.

For example, according to some example embodiments, the one or more end effector assemblies are configured to pick a plurality of molded bottles C at a first location generally near the molding machine and carry them to a second location for placement atop a conveyor belt. According to example embodiments, the end effector assemblies are configured such that the one or more bottles C are picked in a first spaced-apart configuration and placed in a second spaced-apart configuration. According to one example embodiment and in addition to reconfiguring the one or more bottles C from the first spaced-apart configuration (when picked) to the second spaced-apart configuration (when placed), the orientation of the one or more bottles C can be changed prior to placement atop the conveyor belt B. For example, according to one example embodiment, one or more bottles C are picked with the one or more end effectors positioned in a picking orientation, and the one or more containers are placed atop the conveyor belt in a placing orientation.

According to example embodiments of the present invention, the end effector, end effector assemblies and/or methods of use thereof can be configured such that one or more bottles, containers, parts, devices, components, or other objects (or an object containing one or more objects) can be (1) picked from a first location, a first position and a first orientation (e.g., picking orientation); (2) carried to a second location; (3) moved to a second position and a second orientation; and (4) placed at the second location.

With reference now to the drawing figures, wherein like reference numbers represent corresponding parts throughout the several views, FIGS. 1-4 show an end effector assembly 10 according to an example embodiment of the present invention. In example embodiments, the end effector assembly 10 comprises an elongate arm plate 20 extending from a first end 10 to a second end and 12 and comprises a length L1 defined therebetween. One or more manifold cradle assemblies 80 are generally movable along the length L1 of the elongate arm plate 20 and a linkage assembly 200 movably couples the one or more manifold cradle assemblies 80 to the elongate arm plate 20. In example embodiments, the linkage assembly 200 is configured such that the one or more manifold cradle assemblies 80 can be reconfigurable between a first spaced-apart array (see FIGS. 1-2) and a second spaced-apart array (see FIGS. 3-4) extending along the length L1 of the elongate arm plate 20. In example embodiments, each of the one or more manifold cradle assemblies 80 comprise at least one engagement member 120 that is pivotable between a picking orientation (see FIGS. 1-3) and a placing orientation (see FIG. 4).

In example embodiments, a push-to-pull motion conversion assembly 140 (see FIG. 6) provides for the pivoting of the at least one engagement member 120 and comprises a first drive member 142 that is movable along at least a portion of the length L1 of the elongate arm plate 20 and a second drive member 180 that is linked with the first drive member 142. In example embodiments, movement of the first drive member 142 along at least a portion of the length L1 of the elongate arm plate 20 causes movement of the second drive member 180 in a direction generally transverse to the movement of the first drive member 142. In example embodiments, movement of the second drive member 180 in the transverse direction causes the at least one engagement member 120 of the one or more manifold cradle assemblies 80 to pivot from the picking orientation to the placing orientation. According to one example embodiment, the at least one engagement member 120 of the one or more manifold assemblies 80 pivots between about 40-95 degrees from the picking orientation to the placing orientation. In alternate example embodiments, the pivoting movement of the at least one engagement member of the one or more manifold assemblies 80 can be configured to pivot less than about 40 degrees or more than about 95 degrees, as desired.

According to one example embodiment, the end effector assembly 10 comprises a plurality of manifold cradle assemblies 82, 84, 86, 88, 90, 92 mounted thereto. According to one example embodiment, the manifold cradle assembly 82 is generally fixedly mounted to the end effector assembly 10 and the plurality of other manifold cradle assemblies 84, 86, 88, 90, 92 are movably mounted to the end effector assembly 10 such that the entirety of the plurality of manifold cradle assemblies 80 can be reconfigurable along the length L1 between a first spaced-apart configuration (see FIGS. 1-2) and a second spaced-apart configuration (see FIGS. 3-4). According to one example embodiment, the end effector assembly 10 comprises about six total manifold cradle assemblies 80. In alternate embodiments, more or less than six manifold cradle assemblies can be provided as desired.

In example embodiments, each manifold cradle assembly 80 comprises the at least one engagement member 120 for attachment with a portion of an outer surface of the bottle C, for example, by suction or vacuum according to one example embodiment. According to the depicted example embodiment, two engagement members 120 are provided per manifold cradle assembly 80, for example, which are generally stacked atop and spaced apart from each other about a central vertical axis X. In example embodiments, the engagement members 120 comprise suction cups 120 comprising a polyurethane material that is generally flexible and provides for conforming with the outer surface of the bottles C as will be described below. In example embodiments, the at least one suction cup 120 is capable of pivoting between a picking orientation (see FIG. 2) and a placing orientation (see FIG. 4). For example, according to example embodiments, a plurality of conduits can be connected to each of the manifold cradle assemblies so as to provide adequate suction to the at least one suction cup 120 of each of the manifold cradle assemblies 80.

Figure 8E:
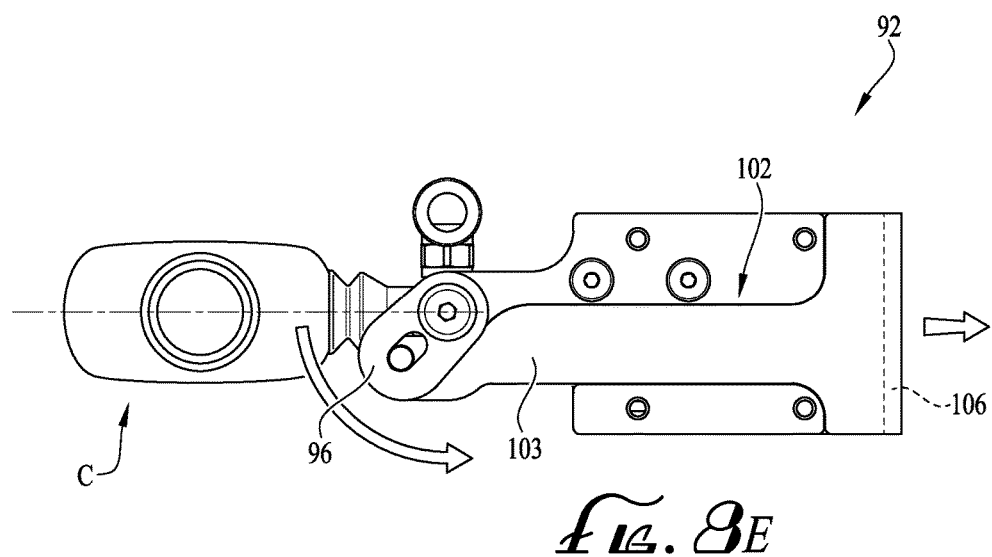
FIGS. 8E-F show a sequence of operation of the manifold assembly, showing the engagement member engaged with a container and moveable between a picking orientation and a placing orientation.
Figure 8F:
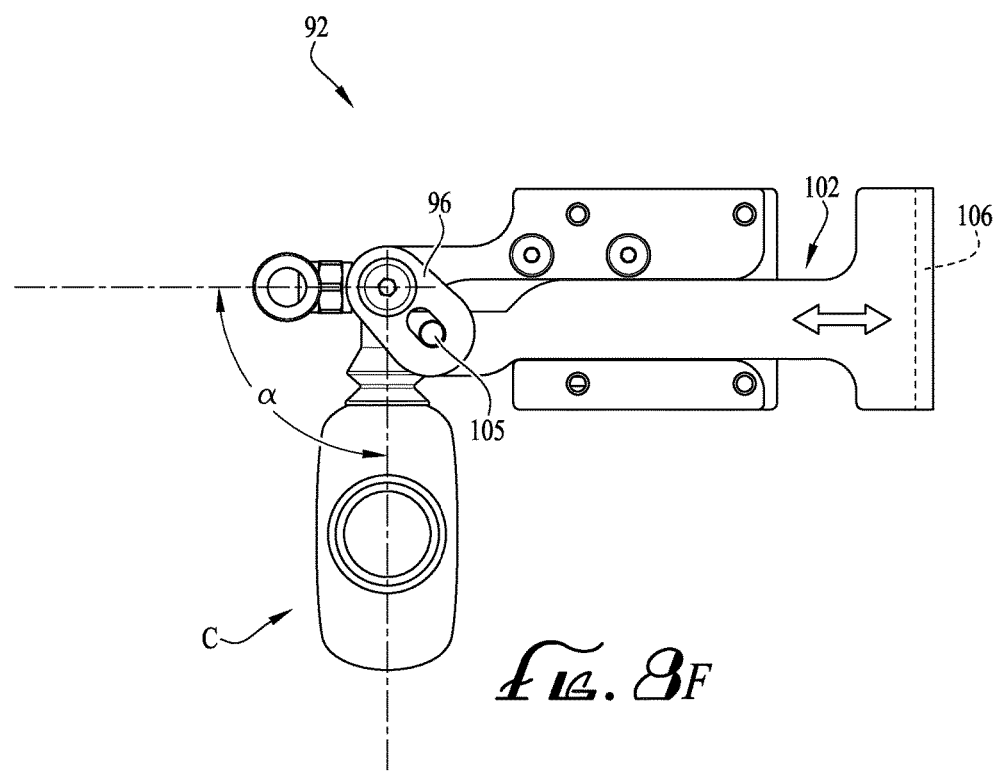

FIGS. 8A-F show the manifold cradle assembly 92 in greater detail. In example embodiments, the manifold cradle assembly 92 comprises a main body portion 93 comprising a slot or channel 94 for permitting sliding engagement of a manifold cam lever arm 103 therein, for example, such that a manifold 108 comprising the vacuum cups 120 mounted thereto is oriented so that the vacuum cups 120 extend either 1) axially in a direction generally opposite the main body portion 93 and about an axis that is generally aligned with a receiver or pivot 95a of the main body portion 93 (see FIGS. 8D-E—also known as the picking orientation), or 2) about an axis that is generally transverse the extension of the suction cups 120 in the picking orientation, for example, and defining an angle α between the picking orientation and the placing orientation. According to example embodiments of the present invention, the angle α is generally between about 40-95 degrees, for example, between about 45-90 degrees according to one example embodiment of the present invention. As depicted in FIGS. 8E-F and according to one example embodiment of the present invention, the angle α is generally about 90 degrees, for example, such that the manifold pivots about 90 degrees in a counter-clockwise direction from the picking orientation (see FIG. 8E) to the placing orientation (see FIG. 8F).

In example embodiments, the manifold 108 defines a generally elongate member comprising one or more openings formed thereon for receiving the vacuum cap fittings 118, which will generally be passed through a portion of the vacuum cups 120 and sealingly engaged with the openings. A lower end of the manifold 108 comprises a set screw 110 to provide adjustment to the suction or vacuum provided at the vacuum cups 120. In example embodiments, an engagement pin or rod 109 is defined at an upper portion of the manifold 108 and comprises an upper portion having one or more flat faces defined thereon. In example embodiments, the rod 109 is configured for fitting within the pivot 95a of the main body portion such that the upper portion thereof engages with a complementary-shaped opening 97 of a cam member 96. A fastener is provided for securing the cam 96 to the upper portion of the rod 109, and the one or more flat faces of the upper portion of the rod 109 interengage with the complementary-shaped opening such that pivoting or rotational movement of one of the manifold 108 or cam 96 causes substantially similar pivoting or rotational movement of the other of the manifold 108 or cam 96. For example, according to one example embodiment, the cam lever arm 103 comprises a rear end 102 and a front end 104, and the front end 104 comprises a projection 105 that is configured for being received within a driving slot 98 of the cam 96. Thus, as depicted in FIGS. 8E-F, sliding movement of the cam lever arm 103 within the channel 94 of the main body portion 93 causes the manifold 108 to pivot between the picking orientation (see FIG. 8E) and the placing orientation (see FIG. 8F). For example, with the projection 105 constrained to engagement with the driving slot 98, retraction of the cam lever arm 103 causes the projection 105 to drive the cam 96 in the counter-clockwise direction, and thus causes the manifold 108 (and suction cups 120 attached thereto) to pivot to the placing orientation.

The rear end 102 of the cam lever arm 103 comprises an overhang or flange 106 that is configured for being received within a portion of the push-to-pull motion conversion assembly 140, for example, for fitting within a channel of the second drive member 182. For example, as will be described in greater detail below, the flange 106 is configured for sliding engagement within a channel of the second drive member 182, and wherein actuation of the second drive member 182 causes engagement with the flange 106 to retract the cam lever arm 103, and thus pivot the manifold 108 from the picking orientation to the placing orientation (see FIGS. 1-4 and 6).

Referring back to the manifold cradle assembly 92 of FIGS. 8A-F, a carriage 100 is mounted to a lower portion of the main body portion 93 and comprises a female receiver or channel 101 for engagement with a carriage track 60 that extends along the length L1 of the elongate arm plate 20 (see FIG. 5). Thus, engagement of the channel 101 with the track 60 permits sliding engagement of the one or more manifold cradle assemblies along the track 60, for example, which is generally extending along the L1 of the elongate arm plate 20. A plate or arm cover 99 can be attached to the upper portion of the main body portion 93 so as to cover the cam lever arm 103 and generally prevent the same from becoming disengaged from the channel 94 of the main body portion 93. One or more connectors, elbows or other fittings 112 can be provided for attachment to one or more portions of the manifold cradle assembly 92 (and any of the other manifold cradle assemblies as described herein) such that a tube or other conduit is connectable with the manifold 108 (or other portions thereof) to supply a vacuum or suction to permit operation of the suction cups 120. Furthermore, as will be described in greater detail below, a lower portion of the main body portion 93 comprises a slot or channel 95b that is configured to be captured by a portion of the linkage assembly 200, for example, such that the one or manifold cradle assemblies 80 can move between the first spaced-apart configuration and the second spaced-apart configuration.

In example embodiments, the manifold cradle assembly 92 as described above is generally substantially similar to the manifold cradle assemblies 84, 86, 88 and 90. Thus, according to example embodiments, each of the manifold cradle assemblies 84, 86, 88, 90 and 92 are movable along the length L1 of the elongate arm plate 20 to be configured in either the first spaced-apart configuration or the second spaced-apart configuration. As depicted in FIG. 5, the manifold cradle assembly 82 is generally fixedly mounted to an end of the elongate arm plate 20 (e.g., generally near the first end 12), and the other manifold cradle assemblies 84, 86, 88, 90 and 92 are moveable along the length L1 of the arm plate 20 relative to the fixedly-mounted manifold cradle assembly 82. For example, as depicted in FIGS. 1-2, the manifold cradle assemblies 80 are configured in the first spaced-apart configuration and arranged to define a linear array of manifold cradle assemblies and comprising a length L2 that is defined between the outermost engagement members 120 and a length L3 that is defined between the engagement members 120 of adjacent manifold cradle assemblies. In example embodiments, the length L2 is between about 7-9 inches and the length L3 is between about 1.5-3 inches.

As depicted in FIG. 3, the manifold cradle assemblies 80 are configures in the second spaced-apart configuration and arranged to define a linear array of manifold cradle assemblies and comprising a length L4 that is defined between the outermost engagement members 120 and a length L5 that is defined between the engagement members 120 of adjacent manifold cradle assemblies. In example embodiments, the length L4 is between about 15-20 inches and the length L5 is between about 3-5 inches. As depicted in FIG. 4, with the engagement members 120 in the placing orientation, a length L6 is defined between an end surface of the engagement member 120 and an edge of an adjacent arm cover 99 and a length L7 defines the distance between the edge of the arm cover 99 and a rear edge of the same manifold 108. In example embodiments, the length L6 is between about 1.5-3.5 inches and the length L7 is between about 0.12-1.50 inches. In example embodiments, the manifold cradle assembly 80 is such that they extend from the elongate arm plate 20 to define a width W1 between an outermost edge of the elongate arm plate 20 and an end surface of the one or more engagement members 120 (see FIG. 1). According to one example embodiment, the width W1 is generally between about 2.5-6 inches.

According to example embodiments, one or more of the manifold cradle assemblies are movably mounted to the elongate arm plate 20 (e.g., carriage 100 and track 60). In the depicted embodiment of FIGS. 5-7, about six manifold cradle assemblies are provided on the elongate arm plate and reconfigurable between the first spaced-apart configuration and the second spaced-apart configuration, for example, such that the first and second spaced-apart configurations define a linear array of manifold cradle assemblies which are either spaced closely together (e.g., first spaced-apart configuration) or spread further apart from each other (e.g., second spaced-apart configuration).

As depicted in FIGS. 5-7, 9A-B and 10-11, the linkage assembly 200 preferably couples with each of the movably mounted manifold cradle assemblies 84, 86, 88, 90 and 92 such that each of the manifold cradle assemblies are restrained based on the position of one or more guide posts or rods 214, 226, 236, 246 and 256 that extend from a plurality of inter-linked linkage members 210, 220, 230, 240, 250, 260 and 270. In example embodiments, the rods are configured for engagement within the guide channels of the main body portions of each of the manifold cradle assemblies (e.g., channel 95b of manifold cradle assembly 93—see FIG. 8B).

For example, according to example embodiments, the linkage assembly 200 comprises a plurality of inter-linked linkage members 210, 220, 230, 240, 250, 260 and 270 that can be reconfigurable between a stacked configuration and an expanded configuration. As depicted in FIGS. 5-7, the linkage assembly 200 is in the stacked configuration such that the rods 214, 226, 236, 246 and 256 are positioned to define the first spaced-apart configuration. And as depicted in FIGS. 9A-11, the linkage assembly 200 is in the expanded configuration that that the rods 214, 226, 236, 246 and 256 are positioned to define the second spaced-apart configuration.

In example embodiments, the elongate arm plate 20 extends from a first end 21 to a second end 22 and comprises a plurality of guidance slots or channels 24, 25 and 26 for receiving one or more of the rods 214, 226, 236, 246 and 256 of the linkage assembly 200 to restrict the allowable movement of the linkage members 210, 220, 230, 240, 250, 260 and 270. For example, the rod 214 is constrained to move along the channel 24, the rods 236 and 256 are constrained to move along the channel 25, and the rods 226 and 246 are constrained to move along the channel 26. As depicted in FIG. 9A, a mounting portion 30 is provided for attachment of the fixedly mounted manifold cradle assembly 82, an elongate recessed portion 31 is defined along a side of the elongate arm plate 20 for receiving the first drive member 142 of the push-to-pull motion conversion assembly 140, and an elongate channel or recessed portion 32 defines an area wherein the linkage assembly 200 movably mounts for restraining the movement of the manifold cradle assemblies between the first spaced-apart configuration and the second spaced-apart configuration. As depicted in FIG. 7, a cover plate 50 is provided for attachment to a bottom portion of the elongate arm plate 20 for containing the linkage assembly 200 within the recessed portion 32. The plate 50 generally extends from a first end 42 to a second end 44 and comprises an elongate slot 46 defiled along a portion thereof for restraining a portion of the linkage assembly, and one or more openings or holes are provided for receiving fasteners to mount the plate 40 to the bottom of the elongate arm plate 20. Referring back to FIG. 9B, the recessed portion 32 comprises a length L8 that is generally between about 15-20 inches. In alternate embodiments, the length L8 can be chosen as desired. The second end 22 of the elongate arm plate 20 comprises a receiver 27 for receiving a drive cylinder assembly 175, for example, for coupling with the push-to-pull motion conversion assembly 140 to cause pivotal movement of the engagement members 120 between the picking and placing orientations.

Figure 14A:
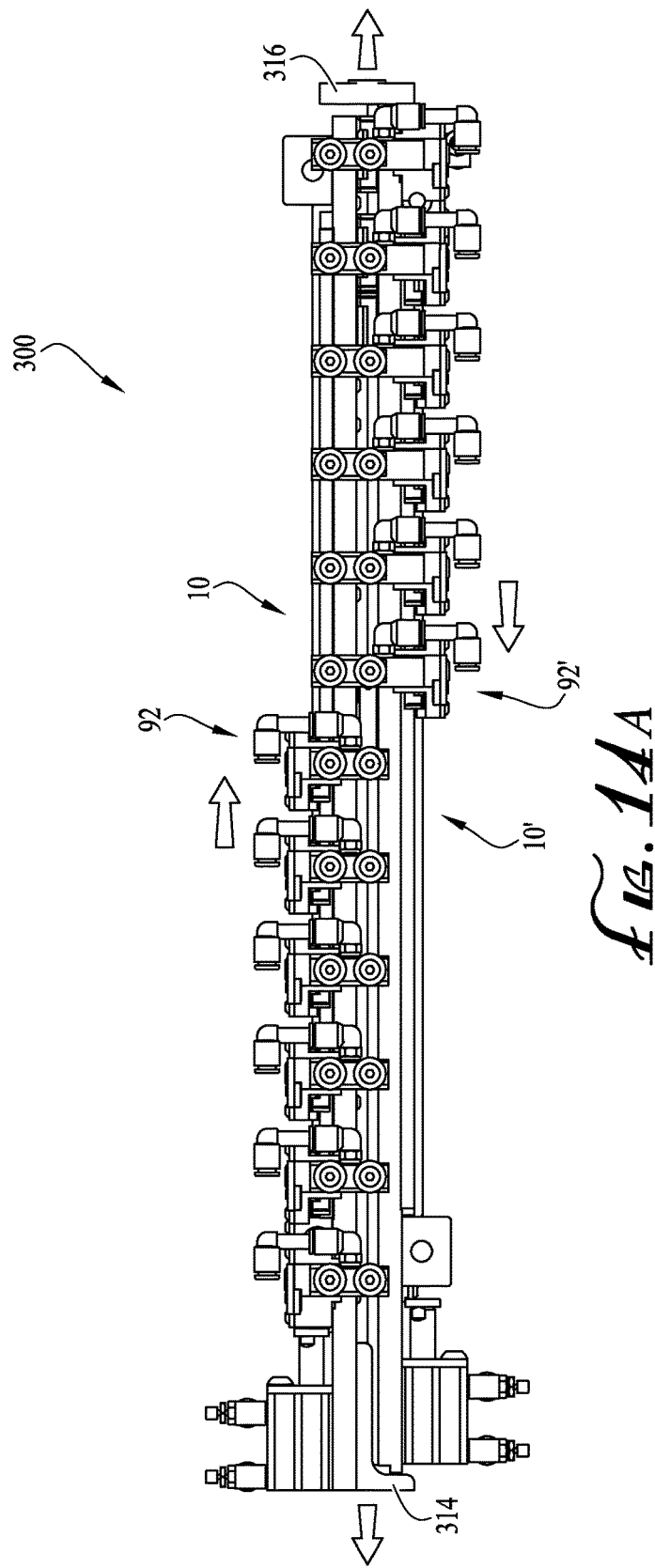
FIG. 14A shows a front plan view of the pair of the movably mounted end effector assemblies of FIG. 12.
Figure 14B:
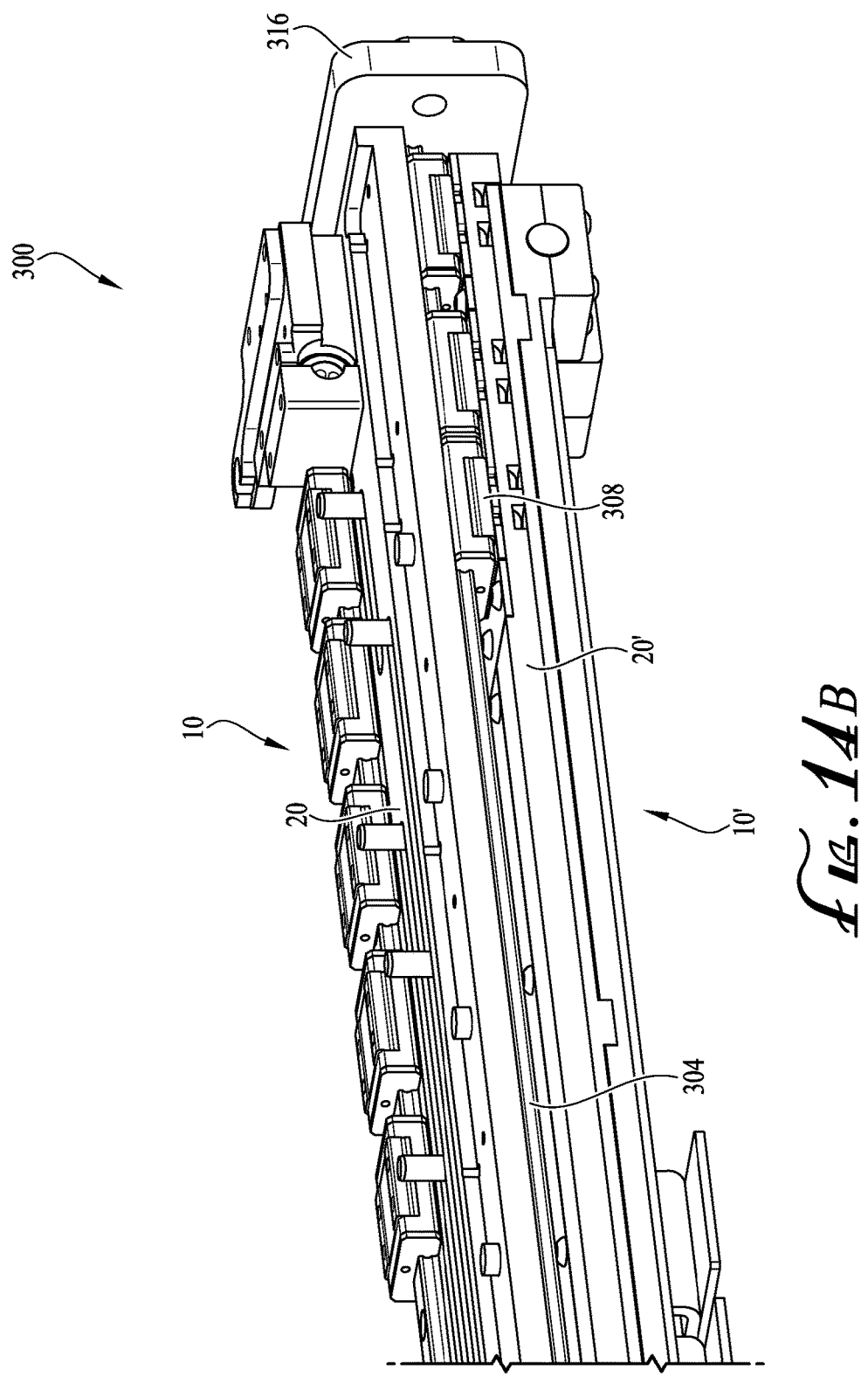
FIG. 14B shows a close-up perspective view of a portion of the movably mounted end effector assemblies of FIG. 12.
Figure 20:
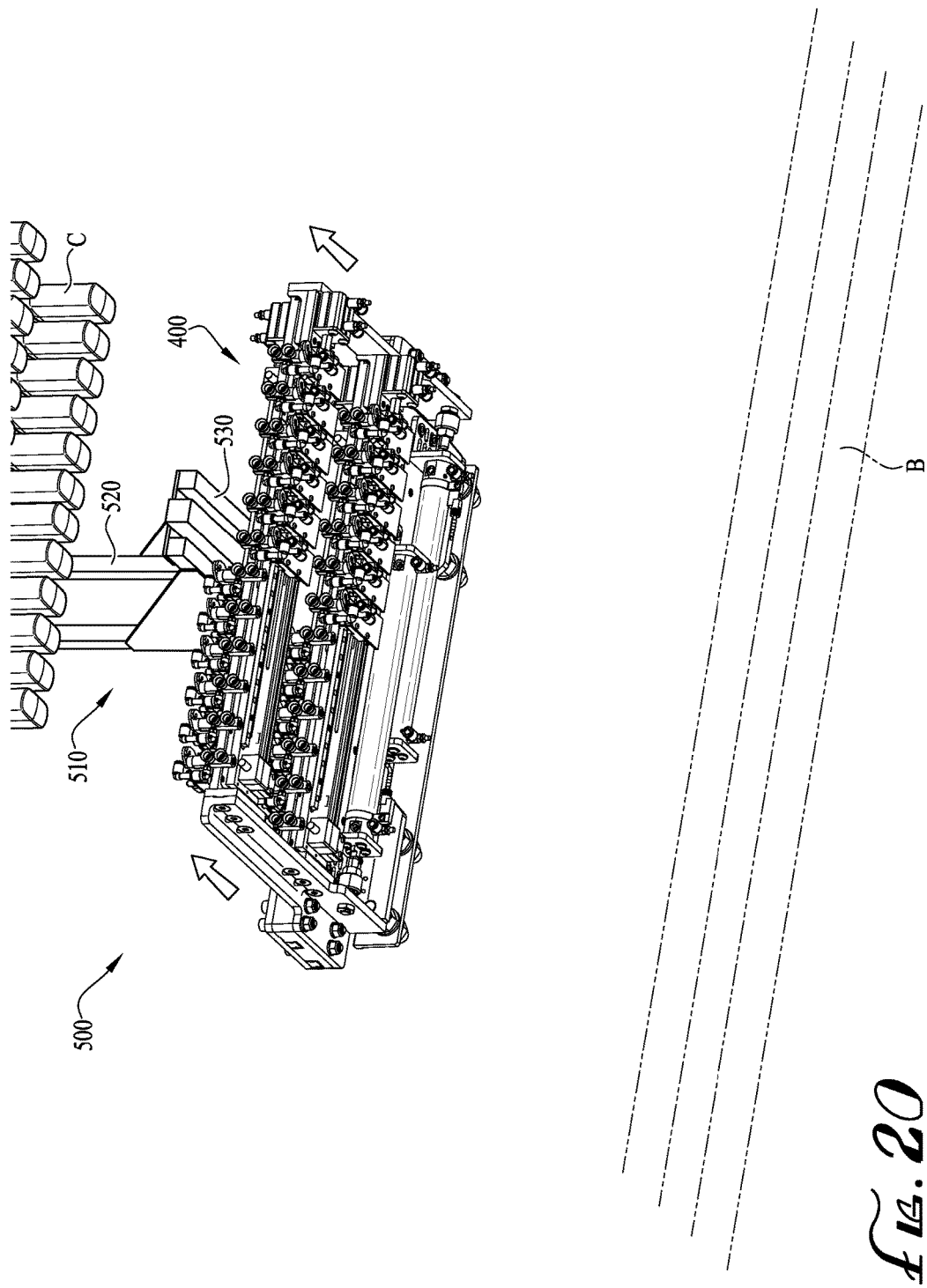

FIGS. 10-11 show the linkage assembly 200 in the expanded configuration. As depicted, the linkage assembly 200 comprises a plurality of inter-linked linkage members 210, 220, 230, 240, 250, 260 and 270 to restrain the linear movement of the manifold assemblies such that they remain generally equally spaced apart in either of the first or second spaced-apart configurations. As depicted, the first linkage 210 comprises an end portion 212 comprising the rod 214 extending from one side thereof and a protrusion 216 axially aligned with the rod 214 and extending from an opposite side of the first linkage 210. The second linkage 220 comprises a slot 222 for receiving the protrusion 216 of the first linkage 210, an end portion 224 and a rod 226 extending from the end portion 224. The third linkage 230 comprises a slot 232 for receiving the rod 226, a first end portion 233, a second end portion 234, a rod 236 extending from one side thereof and a protrusion axially aligned with the rod 236 and extending from an opposite side of the third linkage 230. The fourth linkage 240 comprises a slot 242 for receiving the protrusion 237, an end portion 244 and a rod 246 extending from one side thereof. The fifth linkage 250 comprises a slot 252 for receiving the rod 246, an end portion 254, a rod 256 extending from one side thereof and a protrusion axially aligned with the rod 256 and extending from an opposite side of the fifth linkage 250. The sixth linkage 260 is generally rectangular in shape and comprises a slot 262 formed along a portion thereof for receiving the protrusion 257, and further comprises an hole or opening for receiving a pinion or shaft 274 of a seventh linkage 270. In example embodiments, the seventh linkage 270 generally aligns with the sixth linkage 260 wherein the shaft 274 extends from an outer surface of the seventh linkage 270 through the opening of the sixth linkage 260. In example embodiments, a shaft collar 272 is provided for coupling engagement with the shaft 274. As will be described below, a pair of end effector assemblies 10 can be coupled together such that about twice as many manifold cradle assemblies can be reconfigurable between the first and second spaced-apart configurations. For example, according to example embodiments, the shaft collar 272 preferably couples the shaft 274 with a substantially similar shaft of the seventh linkage of another linkage assembly of another end effector assembly such that the linkage assembly 200 can be coupled with another linkage assembly (see FIGS. 14C-D).

According to example embodiments, the linkages of the linkage assembly 200 are sized and shaped such that they can be configured in the stacked configuration (see FIG. 7) or the expanded configuration (see FIGS. 9A-11). In the stacked configuration, the linkages are configured such that the end portion 212 of the first linkage 210 fittingly mates with the first end portion 233 of the third linkage 230, the end portion 224 of the second linkage fittingly mates with the end portion 244 of the fourth linkage 240, and the second end portion 234 of the third linkage 230 fittingly mates with the end portion 254 of the fifth linkage 250. The seventh linkage 270 is generally fixedly mounted to the sixth linkage 260 such that an outer periphery or edge of the seventh linkage 270 generally abuts an end portion of the fifth linkage 250. In the expanded configuration, the protrusion 216 of the first linkage 210 is retained within an end portion of the slot 222 of the second linkage 220, the rod 226 is retained within an end portion of the slot 232 of the third linkage 230, the protrusion 237 is retained within an end portion of the slot 242 of the fourth linkage 240, the rod 246 is retained within an end portion of the slot 252, and the protrusion 257 is retained within an end portion of the slot 262 of the sixth linkage 260. Preferably, according to example embodiments of the present invention, the linkage assembly 200 is configured such that the rods projecting from the inter-linked linkages (and passing through the channels 24, 25 and 26 of the elongate arm plate 20) maintain a substantially similar spacing therebetween in either of the first or second spaced-apart configurations. In alternate example embodiments, one or more linkages, components, engagement members, mechanisms or other components and/or guides can be provided to restrain the one or more manifold cradle assemblies between the first and second spaced-apart configurations.

Referring back to FIGS. 1-6, the push-to-pull motion conversion assembly 140 provides for the pivoting of the engagement members 120 of the manifold cradle assemblies between the picking and placing orientations. In example embodiments, the first drive member 142 is generally elongate, extending from a first end 144 to a second end 146, and is configured for movable engagement with the elongate recessed portion 31 of the elongate arm plate 20. As depicted in FIG. 6, the first drive member 142 comprises a plurality of spaced-apart slots 150 formed along the length of the first drive member 142 for engagement with projections or guide pins 23 that project from the elongate recessed portion 31. In example embodiments, each of the slots 150 are configured for movable engagement with the corresponding guide pin 23 (see FIG. 9A) of the recessed portion 31. An upper surface of the first drive member 142 comprises spaced-apart projections or wedge-like guides 152 that are generally angled to extend at an angle relative to the extension of the first drive member 142. In example embodiments, the second drive member 180 comprises a generally elongate member 182, an elongate channel 183 for receiving the flanges 106 of the one or more manifold cradle assemblies, and one or more cam surfaces or guide slots 184 (see FIG. 2) that are formed on a bottom portion thereof for complementary engagement with the guides 152 of the first drive member 142. A drive plate bracket 160 is provided for coupling the first end 144 of the first drive member 142 to the drive cylinder assembly 175, for example, such that actuation of the drive cylinder assembly 175 causes linear movement of the first drive member 142 along the recessed portion 31, thereby causing the guides 152 to move along the guide slots 184, which in turn causes a generally transverse movement of the second drive member 180 (see FIG. 4). According to one example embodiment, the drive cylinder assembly 175 comprises an end coupling 178 that is configured to be mounted with an end portion 164 of the end plate bracket 160, for example, wherein a fastener projects through an opening thereof and couples with the end coupling. Similarly, one or more fasteners couple an end portion 162 of the end plate bracket 160 to the first end 144 of the first drive member 142.

In example embodiments, with the flanges 106 movable within the elongate channel 183, movement of the second drive member in a direction generally transverse the movement of the first drive member 142 causes retraction of the cam lever arm 103 such that the manifold 108 pivots from the picking orientation to the placing orientation. In example embodiments, one or more linear alignment guides 186 are provided at the ends of the second driving member 180 to provide guidance thereto and restrain the same to move only along a linear path. As depicted in FIG. 6, a portion of the manifold cradle assembly 82 comprises an alignment shaft and bearing for cooperative engagement with the linear alignment guide near the first end 12 of the assembly 10.

According to one example embodiment, the at least one engagement member 120 of the one or more manifold assemblies 80 pivots between about 40-95 degrees from the picking orientation to the placing orientation. In alternate example embodiments, the pivoting movement of the at least one engagement member of the one or more manifold assemblies 80 can be configured to pivot less than about 40 degrees or more than about 95 degrees, as desired.

Figure 8G:
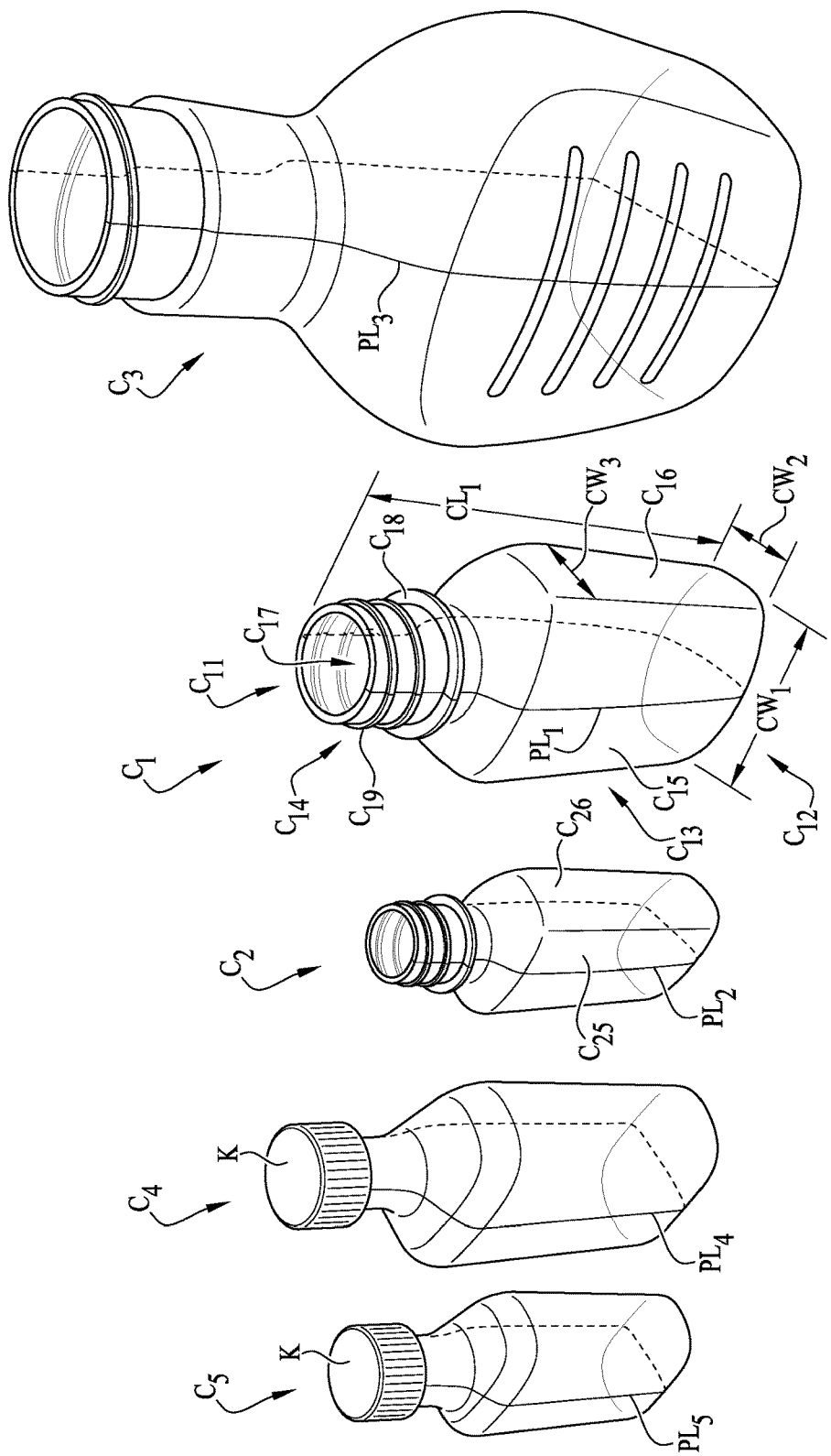
FIG. 8G shows a plurality of example containers that can be picked and placed with the end effector assembly according to example embodiments of the present invention.
Figure 12:
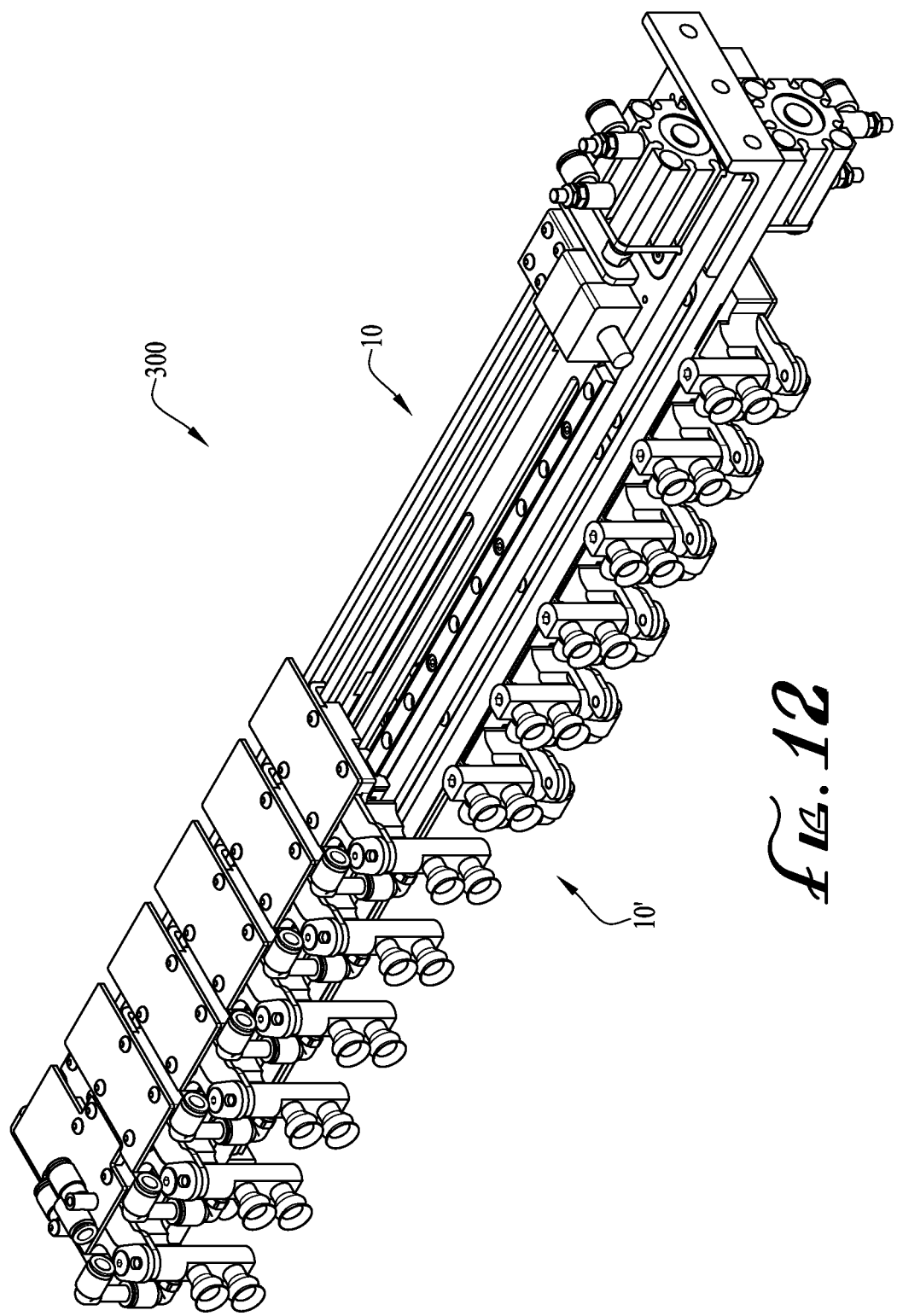
FIG. 12 shows a top perspective view of a pair of end effector assemblies movably mounted together according to an example embodiment of the present invention.
Figure 13:
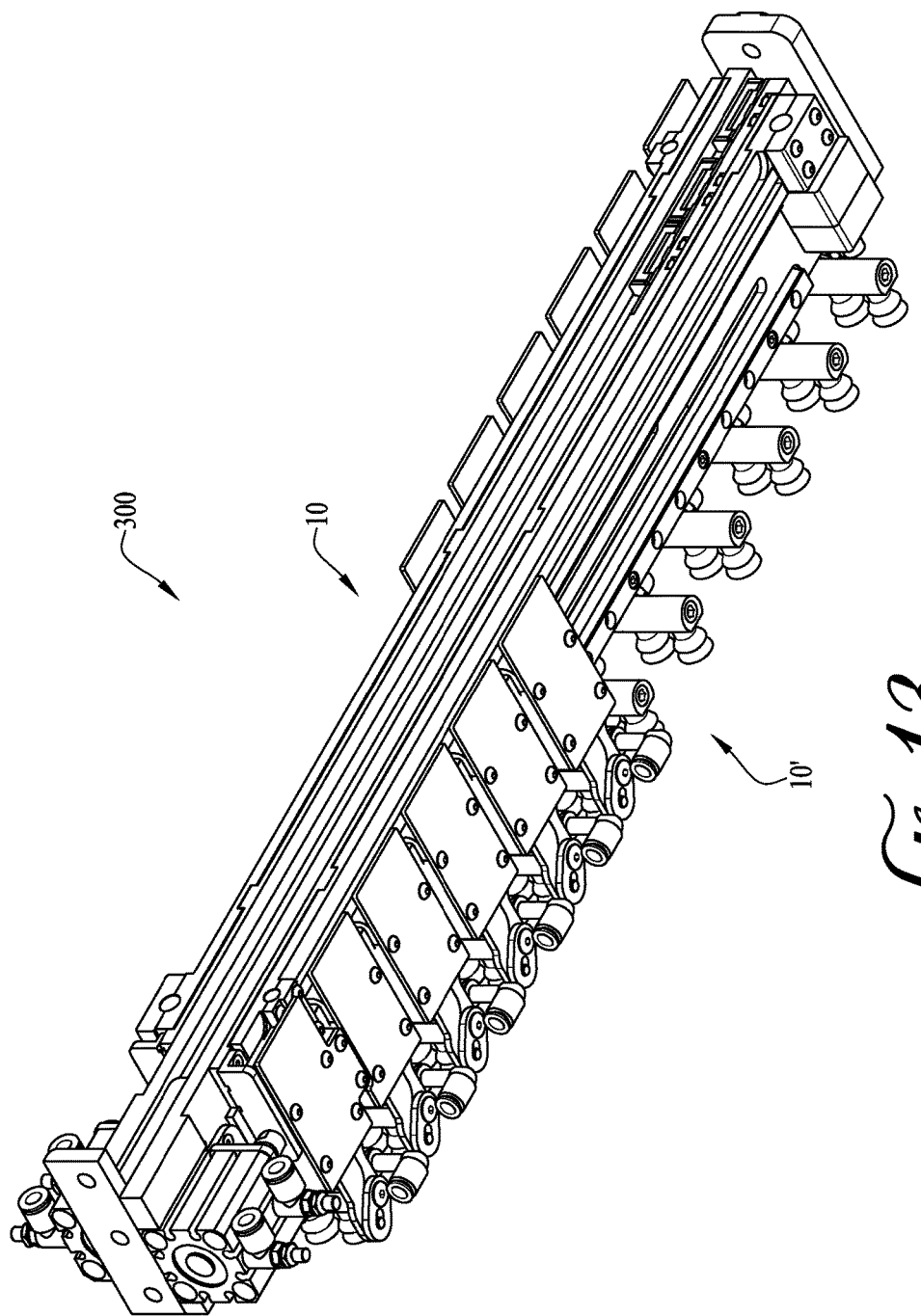
FIG. 13 shows a bottom perspective view of the movably mounted end effector assemblies.

FIG. 8G shows a plurality of containers or bottles C according to example embodiments of the present invention. In example embodiments, the present end effector assembly 10 is preferably capable of picking one or more bottles C from a first location generally near a mold, and moving the one or more bottles C to a second location, and placing the one or more bottles C at the second location. As is described above, the one or more bottles C are picked from the first location with the manifold cradle assemblies in the first spaced-apart configuration and picking orientation, and the one or more bottles are placed at the second location in the second spaced-apart configuration and placing orientation.

According to some example embodiments, and in particular with respect to the bottles C depicted in FIG. 8G, the manufacturing or molding process by which the bottles C are made causes an unconventional parting line to be defined at a midpoint of the front and rear surfaces. For example, the container C1 comprises a first end C11, a second end C12, a body portion C13, an open end portion C14, front and rear surfaces C15, left and right side surfaces C16, an opening C17 defined at the open end portion C14, a collar C18 outwardly protruding about the circumference of the open end portion C14, and one or more threads C19 for compatible engagement with threads of a cap or lid K. A parting line PL1 is defined at about the midpoint of the front and rear surfaces C15, for example, which represents the position where the mold halves meet prior to forming the bottle C (e.g., by way of injection molding, blow molding, injection blow molding, or other desired manufacturing methods). In example embodiments, the bottle C comprises a width CW1, a depth CW2, and a height CL1. According to one example embodiment, the width CW1 is about 2 inches, the depth CW2 is about 1.09 inches, and the height CL1 is about 4.9 inches. In alternate embodiments, the other bottles such as C2, C3, C4 or C5 can similarly be picked and placed as described herein and can comprise any desirable size and/or shape.

As such, with the parting line PL1 positioned about the midpoint of the front and rear surfaces C15, a multi-cavity mold would be configured such that a plurality of bottles C1 are arranged with the front or rear surface C15 of one bottle C1 facing the front or rear surface C15 of an adjacent bottle C1, for example, such that each of the side surfaces C16 are arranged to be planar with each other. Thus, when the bottles C1 are removed from the mold or presented for picking by the end effector assembly 10, the front and rear surfaces C15 are generally spaced closely together such that the engagement members 120 couple with one of the side surfaces C16 thereof. According to example embodiments, the engagement members 120 can be sized as desired to provide for coupling engagement with one of the side surfaces C16 of the bottles C.

In alternate example embodiments, other engagement members or grippers can be provided as desired, for example, which can be arranged in a first spaced-apart configuration and a picking orientation when picking the one or more components, and wherein the engagement members or grippers can be positioned in a second spaced-apart configuration and a placing orientation when placing the one or more components. As depicted herein, the engagement members 120 comprise vacuum cups, however according to alternate example embodiments other engagement members such as a pneumatic gripper, a hydraulic gripper, a servo-electric gripper, or other various end of arm tooling can be used for picking and placing one or more components, parts, containers, etc. as desired.

FIGS. 12-14D show an end effector assembly 300 according to another example embodiment of the present invention. According to example embodiments, the end effector assembly 300 comprises a pair of end effector assemblies 10, 10' that are movably mounted together and movable relative to each other between a compact configuration (see FIGS. 12-14A) and an expanded configuration (see FIGS. 25-28). According to one example embodiment and depicted in FIG. 14B, the end effector assembly 10 comprises a carriage track or guide rail 70 extending along the length L1 of a bottom portion of the elongate arm plate 20 (see also FIG. 7). In example embodiments, one or more carriage members 308 are mounted to a bottom surface of the end effector assembly 10' and slidingly engage with the guide rail 304 such that the end effector assemblies 10, 10' are permitted to linear movement. Thus, in example embodiments, the end effector assembly 300 is configured to be repositionable or movable between the compact and expanded configurations.

Accordingly, the end effector assembly 300 links and guides the end effector assemblies 10, 10' to cooperate with each other when the ends thereof are pulled outwards to the expanded configuration or pushed inwards to the compact configuration. According to some example embodiments, the assembly 300 can comprise brackets or mounts 314, 316 that are mounted to end portions of the assemblies 10, 10', for example, which can be mounted as desired to one or more movable arms (e.g., an arm coupled to the bracket 314 and another arm coupled to the bracket 316). According to example embodiments, the arms move the mounts 314, 316 between the compact and expanded configurations. In the compact configuration, the manifold cradle assemblies (twelve as depicted) are arranged in the first spaced-apart configuration and the engagement members are in the picking orientation. In the expanded configuration, the manifold cradle assemblies are arranged in the second spaced-apart configuration. Preferably, while in either of the first or second spaced-apart configurations, the engagement members 120, 120' of the end effector assemblies 10, 10' are repositionable between the picking orientation (see FIG. 25) and the placing orientation (see FIG. 26).

In example embodiments, the end effector assembly 10' is preferably substantially similar to the end effector assembly 10 (and as described above). According to one example embodiment and as depicted in FIG. 14D, the cam lever arms of the end effector assembly 10' (and channel of the main base portion for receiving the arm) are generally shaped to mirror the arms of the manifold assemblies 80 of the end effector assembly 10, for example, such that the manifolds (and engagement members thereof) of the end effector assembly 10' pivot in a direction generally opposite the pivoting direction of the manifolds (and engagement members thereof) of the end effector assembly 10.

FIGS. 15-19 show an end effector assembly 400 according to another example embodiment of the present invention. In example embodiments, the end effector assembly 400 comprises a base plate assembly 410 comprising a base plate 412 having a pair of drive cylinders 414, 416 mounted thereto and generally oppositely-directed to drive a plate assembly 430 movably mounted to the base plate 412. In example embodiments, the plate assembly 430 comprises upper plates 432, 436 and arm extensions 450 coupled thereto such that the drive cylinders 414, 416 drive the upper plates 432, 436 outwards from a central or middle portion of the end effector assembly 400.

As depicted in FIG. 19, the base plate 412 comprises a plurality of carriage receivers or members 440 connected thereto and aligned for receiving spaced-apart carriage tracks or guide rails 434, 438 of the upper plates 432, 436. Thus, the upper plates 432, 436 (and guide rails 434, 438 thereof) are movable with respect to each other and the base plate 412. According to example embodiments, the ends of the upper plates 432, 436 comprise mounting blocks 433, 437 mounted thereto for receiving the upper mounting ends 452 of the arm extensions 450. As depicted in FIG. 19, ends of the drive cylinders 414, 416 pass through openings of the brackets 418 (see FIG. 18) and connect with the arm extensions 450 (generally near the upper mounting ends 452). In example embodiments, two pairs of spaced-apart openings are provided on each of the arm extensions 450 for attachment of the mounts 314, 316 (and end effector assemblies 300) thereto with one or more fasteners such as bolts, fasteners, etc. (see FIG. 18). In example embodiments, a plurality of fasteners can be provided for mounting the upper plates 432, 436 and corresponding mounting blocks 433, 437 to the upper mounting ends 452 of the arm extensions 450.

As depicted in FIGS. 17-18, threaded support rods 420 mount to the base plate 412 and extend outwardly therefrom for receiving portions of a mounting bracket 422 such the entire assembly 400 can be mounted to a linear arm or other machine (as will be described below) for moving the assembly 400 to pick and place one or more components as desired. According to some example embodiments, one or more nuts or spacers can be sandwiched between the base plate 412 and the mounting bracket 422 such that the mounting bracket 422 remains spaced-apart from the base plate 412. In example embodiments, the openings that receive the threaded support rods 420 are at least somewhat larger such that the relative positioning of the mounting bracket 422 with respect to the end effector assembly 400 can be adjusted such that the end effector assembly 400 is level.

FIGS. 20-28 show an end effector system 500 comprising the end effector assembly 400 that is mounted to a mechanism or linear arm 510 such that the end effector assembly 400 is movable about the vertical support 520 and the horizontal support 530, and thus is generally capable of moving the end effector assembly 400 in both a horizontal and vertical direction. In example embodiments and shown throughout FIGS. 20-28, the end effector assembly 400 picks and holds a plurality of containers with the suction cups in the picking orientation (see FIGS. 20-23) and places and releases the containers C on a conveyor belt B in the placing orientation (see FIGS. 27-28).

According to one example embodiment, the present invention relates to a method of picking and placing one or more parts or bottles C. In example embodiments, the method includes providing an end effector comprising one or more engagement members for coupling engagement with one or more parts, the one or more engagement members being moveable between a first spaced-apart configuration and a second spaced-apart configuration and being reconfigurable between a picking orientation and a placing orientation (see FIG. 20); positioning the one or more engagement members of the end effector in the first spaced-apart configuration and the picking orientation; moving the end effector to a first position near the one or more parts to pick up the one or more parts (see FIGS. 21-22); moving the end effector with the one or more parts attached thereto to a second location (see FIGS. 23-24); moving the one or more engagement members from the first spaced-apart configuration to the second spaced-apart configuration (see FIGS. 24-25) and from the picking orientation to the placing orientation (see FIGS. 25-26); and placing the one or more parts while the one or more engagement members are in the placing orientation (see FIGS. 26-28).

Figure 21:
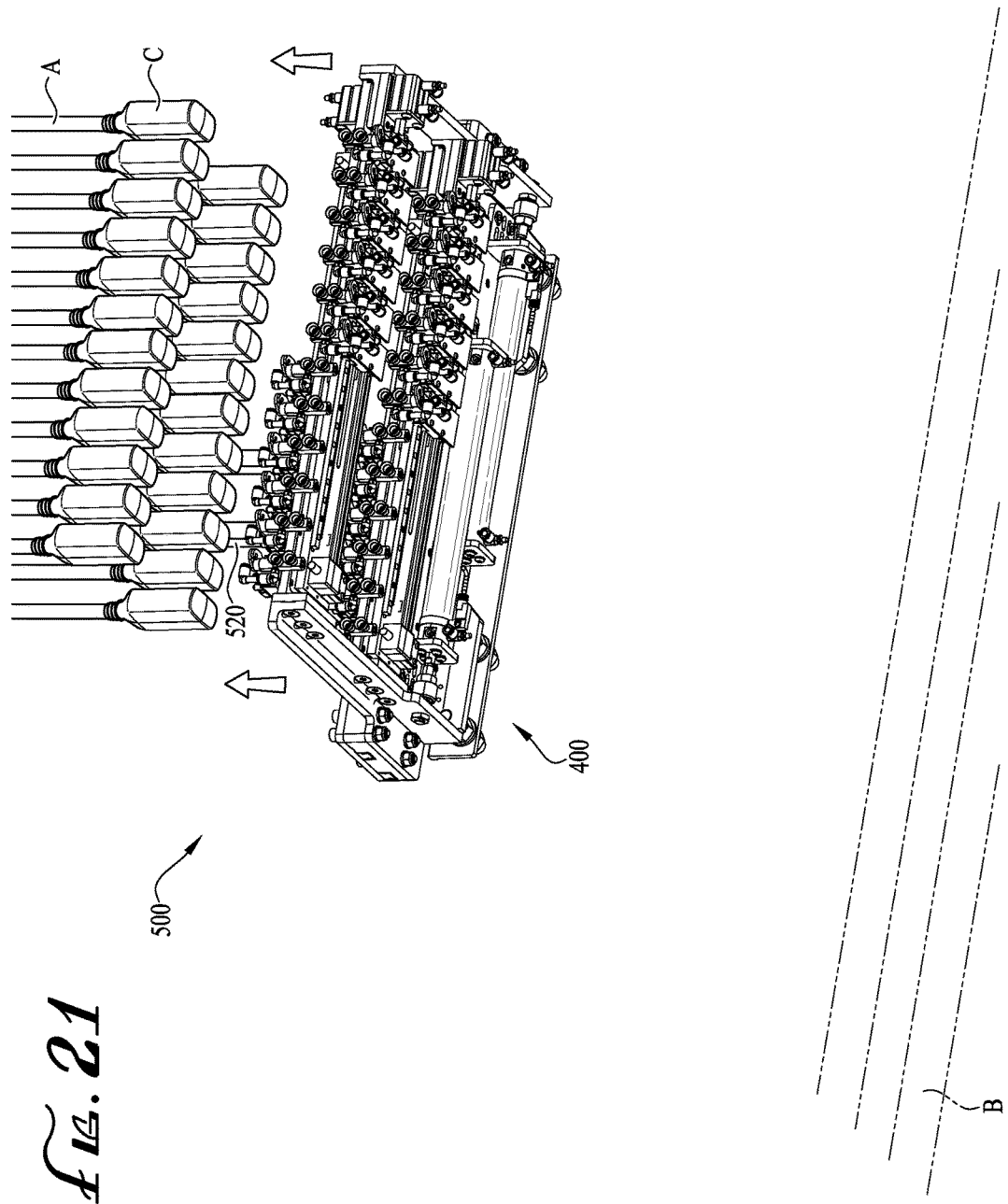
Figure 22:
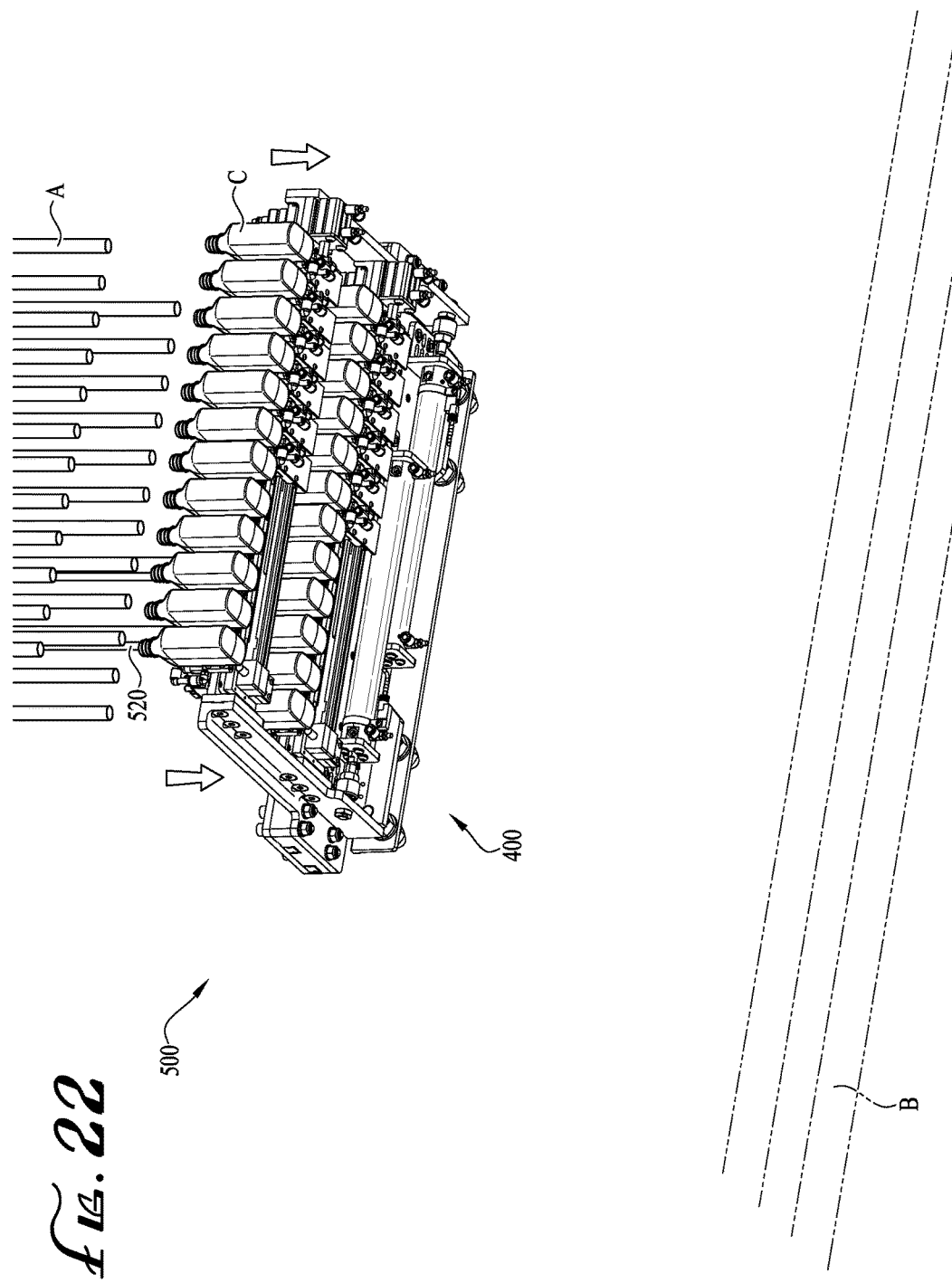
Figure 23:
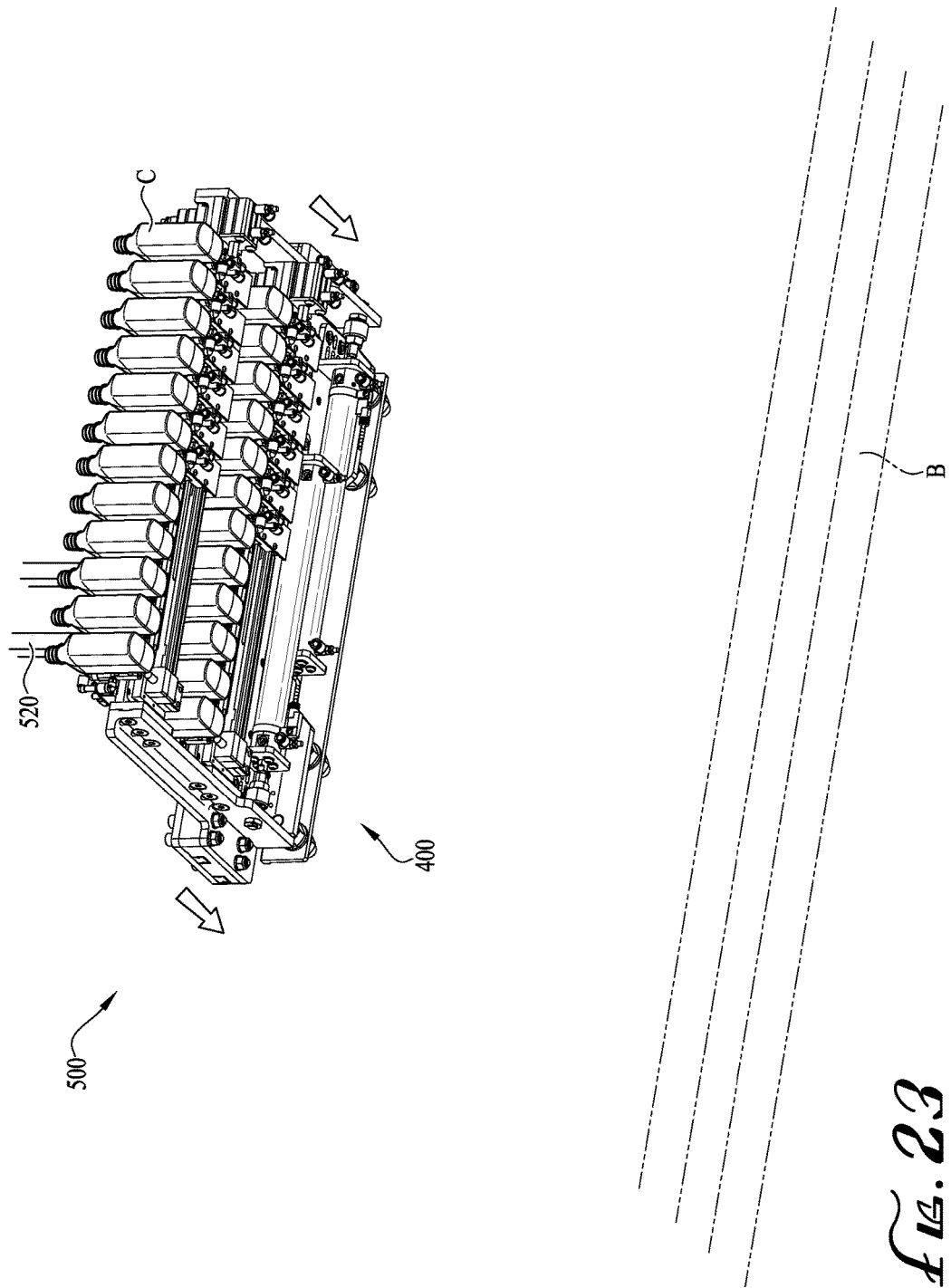

According to one example embodiment, an end of arm assembly A is configured to retrieve the bottles C from the mold and present them to the end effector assembly 400 for allowing attachment of the suction cups to the side surfaces C16 of the bottle C (see FIG. 21). In alternate example embodiments, other tools, arms, mechanisms or other gripper or grasping members can be provided for presenting the bottles C for attachment with the suction cups. According to another example embodiment, the end effector assemblies as described herein can be configured for picking one or more components from a first location and placing the one or more components in a second location. According to one example embodiment, the one or more components to be picked by the end effector assembly 400 can be presented by an arm or tool or other member, or for example, the end effector assembly can be configured for picking one or more components directly from a mold or from atop a table or other support surface.

While the invention has been described with reference to example embodiments, it will be understood by those skilled in the art that a variety of modifications, additions and deletions are within the scope of the invention, as defined by the following claims.

What is claimed is:

1. An end effector assembly for picking and placing objects comprising:
   an elongate arm plate extending from a first end to a second end and comprising a length defined therebetween;
   one or more manifold cradle assemblies movable along the length of the elongate arm plate, each of the one or more manifold cradle assemblies comprising at least one engagement member pivotable between a picking orientation and a placing orientation;
   a linkage assembly movably coupling the elongate arm plate to the one or more manifold cradle assemblies, the linkage configured such that the one or more manifold cradle assemblies can be reconfigurable between a first spaced-apart configuration and a second spaced-apart configuration extending along the length of the elongate arm plate; and
   a push-to-pull motion conversion assembly comprising a first drive member movable along at least a portion of the length of the elongate arm plate and a second drive member linked with the first drive member, wherein movement of the first drive member along at least a portion of the length of the elongate arm plate causes movement of the second drive member in a direction generally transverse to the movement of the first drive member,
   wherein movement of the second drive member in the transverse direction causes the at least one engagement member of the one or more cradle assemblies to pivot from the picking orientation to the placing orientation,
   wherein the first spaced-apart configuration is such that the manifold cradle assemblies are generally spaced close together wherein a first spacing is defined therebetween, and wherein the second spaced-apart configuration is such that the manifold cradle assemblies are generally spaced further apart from each other wherein a second spacing is defined therebetween.

2. The end effector assembly of claim 1, wherein an angle of between about 40-95 degrees is defined between the picking and placing orientations of the at least one engagement member.

3. The end effector assembly of claim 1, wherein the at least one engagement member is configured for picking at least one container from a mold in the picking orientation, and wherein the at least one engagement member is configured for placing the at least one container in the placing orientation.

4. The end effector assembly of claim 3, wherein the at least one engagement member is configured for placement of the at least one container on a conveyor belt.

5. The end effector assembly of claim 4, wherein the at least one container comprises an unconventional parting line.

6. The end effector assembly of claim 3, wherein the at least one engagement member can pivot between the picking and placing orientations independently of the position of the one or more cradle assemblies.

7. The end effector assembly of claim 1, comprising two or more cradle assemblies reconfigurable between the first spaced-apart configuration defining a first spacing between each assembly and the second spaced-apart configuration defining a second spacing between each assembly.

8. The end effector assembly of claim 1, comprising ten cradle assemblies which are movable to be reconfigurable between the first spaced-apart configuration defining a first spacing between each assembly and the second spaced-apart configuration defining a second spacing between each assembly.

9. The end effector of claim 8, wherein an elongate arm coupled together with six cradle assemblies movably mounts with another elongate arm comprising six cradle assemblies, wherein when the elongate arms are generally stacked atop each other when the twelve cradle assemblies are positioned in the first spaced-apart configuration and wherein the elongate arms are generally offset relative to each other in generally opposite directions when the twelve cradle assemblies are positioned in the second spaced-apart configuration.

10. The end effector assembly of claim 1, comprising a plurality of coupled together and spaced-apart cradle assemblies, wherein a first assembly of twelve cradle assemblies is spaced-apart from a second assembly of twelve cradle assemblies, each of the first and second assemblies being reconfigurable between the first spaced-apart configuration defining a first spacing between each assembly and a second spaced-apart configuration defining a second spacing between each assembly.

11. A method for picking and placing one or more parts comprising:
providing an end effector, the end effector comprising one or more engagement members for coupling engagement with one or more parts, the one or more engagement members being moveable between a first spaced-apart configuration and a second spaced-apart configuration and being reconfigurable between a picking orientation and a placing orientation;
positioning the one or more engagement members of the end effector in the first spaced-apart configuration and the picking orientation;
moving the end effector to a first location near the one or more parts to pick up the one or more parts;
moving the end effector with the one or more parts attached thereto to a second location;
moving the one or more engagement members from the first spaced-apart configuration to a second spaced-apart configuration and from the picking orientation to the placing orientation; and
placing and releasing the one or more parts while the one or more engagement members are in the placing orientation,
wherein the one or more parts comprise one or more bottles.

12. The method of claim 11, wherein the one or more bottles are placed on a conveyor belt.

13. The method of claim 11, wherein at least one of the bottles of the one or more bottles comprises an unconventional parting line.

14. The method of claim 11, wherein the engagement members comprise at least one suction cup, and wherein the at least one suction cup provides a vacuum against a narrow side portion of the one or more bottles.

15. The method of claim 11, wherein the one or more bottles are placed on at least one conveyor belt movable along a first direction, and wherein orienting the one or more bottles in the placing orientation causes wide side portions of the one or more bottles to extend in a direction that is generally aligned with the first direction of the conveyor belt.

* * * * *